United States Patent
Lin et al.

(10) Patent No.: US 7,389,921 B2
(45) Date of Patent: Jun. 24, 2008

(54) DYNAMIC COMPONENT MANAGEMENT

(75) Inventors: Tao Lin, Palo Alto, CA (US); Steffen Goebel, Dresden (DE)

(73) Assignee: SAP Aktiengesellschaft, Walldorf (DE)

( * ) Notice: Subject to any disclaimer, the term of this patent is extended or adjusted under 35 U.S.C. 154(b) by 398 days.

(21) Appl. No.: 11/067,585

(22) Filed: Feb. 28, 2005

(65) Prior Publication Data

US 2006/0195473 A1 Aug. 31, 2006

(51) Int. Cl.
G06F 17/60 (2006.01)
(52) U.S. Cl. .......................................... 235/385; 235/375
(58) Field of Classification Search .................. 235/385, 235/451, 375; 340/572.1–572.4, 447; 705/28, 705/22–23, 29, 56, 58
See application file for complete search history.

(56) References Cited

U.S. PATENT DOCUMENTS

| | | | |
|---|---|---|---|
| 6,400,272 | B1 | 6/2002 | Holtzman et al. |
| 2003/0173403 | A1* | 9/2003 | Vogler ......................... 235/385 |
| 2003/0225928 | A1* | 12/2003 | Paul ........................... 709/321 |
| 2004/0049451 | A1 | 3/2004 | Berardi et al. |
| 2004/0082296 | A1* | 4/2004 | Twitchell, Jr. ............... 455/41.2 |
| 2004/0203352 | A1 | 10/2004 | Hall et al. |
| 2005/0198228 | A1* | 9/2005 | Bajwa et al. ................. 709/220 |
| 2005/0258955 | A1* | 11/2005 | Gloekler et al. .......... 340/539.13 |
| 2006/0155818 | A1* | 7/2006 | Odenwald et al. ............ 709/208 |

FOREIGN PATENT DOCUMENTS

WO  WO 2004/074965  9/2004

\* cited by examiner

*Primary Examiner*—Daniel St.Cyr
(74) *Attorney, Agent, or Firm*—Fish & Richardson P.C.

(57) ABSTRACT

An auto-identification system is described that includes a plurality of distributed auto-id nodes that are operable to track physical objects as they move through an operation of an enterprise, such as, for example, a supply chain network or a sales network. The auto-id nodes are distributed across sites of the network, and are in communication with enterprise application systems and/or data acquisition systems such as RFID readers or sensor devices. By focusing on their respective sites, the auto-id nodes minimize the amount of data tracked by their respective enterprise applications. The auto-id node may include a component manager that dynamically loads components for use in the auto-id node, without disrupting an operation of the auto-id node. For example, the component manager may be operable to add a new adaptor component that communicates with a new type of device, without needing to stop and restart the auto-id node.

20 Claims, 13 Drawing Sheets

DYNAMIC COMPONENT MANAGEMENT

TECHNICAL FIELD

This description relates to an auto-id tracking system.

BACKGROUND

Auto-identification (auto-id) systems are used, for example, to identify or otherwise obtain information about products that are to be manufactured, bought or sold, or otherwise used in commerce. For example, information regarding a physical object, such as a box in a backroom, may be stored in association with a tag or other identifier that is affixed to the box, and/or an object tagged with a unique identifier may be located on a shelf in a retail store. Then, some sort of device, such as a reader or sensor, may be used to identify the physical objects, using the identifier, and thereby determine, capture, and use the information stored in a computer system with respect to the box or the object, such as, for example, a brand name of the object or an expiration date of the object.

One example of an auto-id system is known as a Radio-Frequency Identification (RFID) system. RFID generally refers to technologies in which a unique number (and/or other identifying information) is stored on a microchip that is associated with an antenna within an RFID tag or transponder. A reader is used to communicate with the antenna and obtain the unique number from the microchip, and thereby obtain information associated with the unique number. Advantageously, RFID is fast and wireless, does not require a direction or line-of-sight to enable communication between readers and tags, and reduces or eliminates the need for human data entry. As a result, RFID may be used in many applications, such as, for example, identification of tagged objects within stores or warehouses, automatic payment of tolls by cars with RFID tags, and/or identification of authorized personnel for entry into a restricted area.

Many other types of auto-id system devices exist. Examples include 2D bar code scanners, smart card devices/readers, voice recognition systems, optical character recognition systems, and biometric systems (e.g., retinal and fingerprint scans). Many or all such systems have the ability or the potential to reduce costs, increase efficiency, improve data accuracy, provide data with more granularity (even down to the single item/object level), and thereby improve customer satisfaction within the operations of an enterprise system.

SUMMARY

According to one general aspect, a system includes an auto-id node operable to receive item data with respect to an auto-id tracking system for tracking items, a data processing module within the auto-id node that is operable to implement a processing component so as to process the item data during an operation of the data processing module and of the auto-id node, a component manager operable to determine the processing component from a plurality of components, based on the item data, and a component loader operable to load the processing component to the data processing module during the operation of the data processing module and the auto-id node.

Implementations may include one or more of the following features. For example, the data processing module may include a core services module that may be operable to process the item data in the auto-id tracking system. The component loader may include a configurations file that may be operable to output instructions to the component manager for determination of the processing component, based on configuration settings associated with the processing component. The data processing module may include an integration module that may be operable to handle communications between the auto-id node and other elements of the auto-id tracking system.

The processing component may include an adaptor that may be adapted for communication with a designated element of the auto-id-tracking system. The adaptor may include a communicator that may be operable to manage data transport between the adaptor and the designated element, which may include designated communications protocols, and a data converter that may be operable to manage data conversion between a first data format used by the processing component and a second data format used by the designated element.

The processing component may be associated with an active instance for performing a first processing task that may be actively being implemented, and a passive instance for performing a second processing task that may be not actively being implemented. There may be a pool for storing the passive instance of the processing component along with other passive instances of one or more of the plurality of processing components.

The data processing module may include an instance manager that may be operable to activate the passive instance from the pool and implement the passive instance as a second active instance, based on a determination of a change of the second processing task from not being actively implemented to being actively implemented.

The instance manager may be further operable to de-activate the active instance to the pool for storage as a second passive instance, based on a determination of a change of the first processing task from being actively implemented to being not actively implemented. There may be a component repository that may be operable to store the plurality of processing components for selection therefrom by the component manager or the component loader.

According to another general aspect, item data is received at an auto-id node within an auto-id tracking system for tracking items. The item data is analyzed to determine a processing component for processing the item data, from among a plurality of components. The processing component is loaded to a data processing module, during an operation of the data processing module and of the auto-id node, and the item data is processed with the processing component.

Implementations may include one or more of the following features. For example, in loading the processing component to the data processing module, the processing component may be loaded to an integration module that may be operable to handle communications between the auto-id node and other elements of the auto-id tracking system. In loading the processing component to the data processing module, an adaptor that may be adapted for communication with a designated element of the auto-id-tracking system may be loaded.

An active instance of the processing component may be loaded for performing a first processing task that that may be actively being implemented; and a passive instance of the processing component may be stored for performing a second processing task that may not be actively being implemented.

The passive instance from the pool may be activated to implement the passive instance as a second active instance, based on a determination of a change of the second processing task from not being actively implemented to being actively implemented, and the active instance may be de-activated to the pool for storage as a second passive instance, based on a determination of a change of the first processing task from being actively implemented to being not actively implemented.

According to another general aspect, an apparatus includes a storage medium having instructions stored thereon. The instructions include a first code segment for receiving item data at an auto-id node within an auto-id tracking system for tracking items, a second code segment for analyzing the item data to determine a processing component for processing the item data, from among a plurality of components, a third code segment for loading the processing component to a data processing module, during an operation of the data processing module and of the auto-id node, and a fourth code segment for processing the item data with the processing component.

Implementations may include one or more of the following features. For example, the third code segment may include a fifth code segment for loading the processing component to an integration module that may be operable to handle communications between the auto-id node and other elements of the auto-id tracking system. The fifth code segment may include a sixth code segment for loading an adaptor that may be adapted for communication with a designated element of the auto-id-tracking system.

The auto-id tracking system may be operable to automatically collect the item data from a plurality of tracking devices, and may be further operable to process the item data so as to make the item data available to enterprise applications and user interfaces associated with the auto-id tracking system, and to the auto-id tracking system.

Details of one or more implementations are set forth in the accompanying drawings and in the description below. Further features, aspects, and advantages will become apparent from the description, the drawings, and the claims.

DESCRIPTION OF DRAWINGS

Like reference numbers and designations in the various drawings indicate like elements.

DETAILED DESCRIPTION

Figure 1:
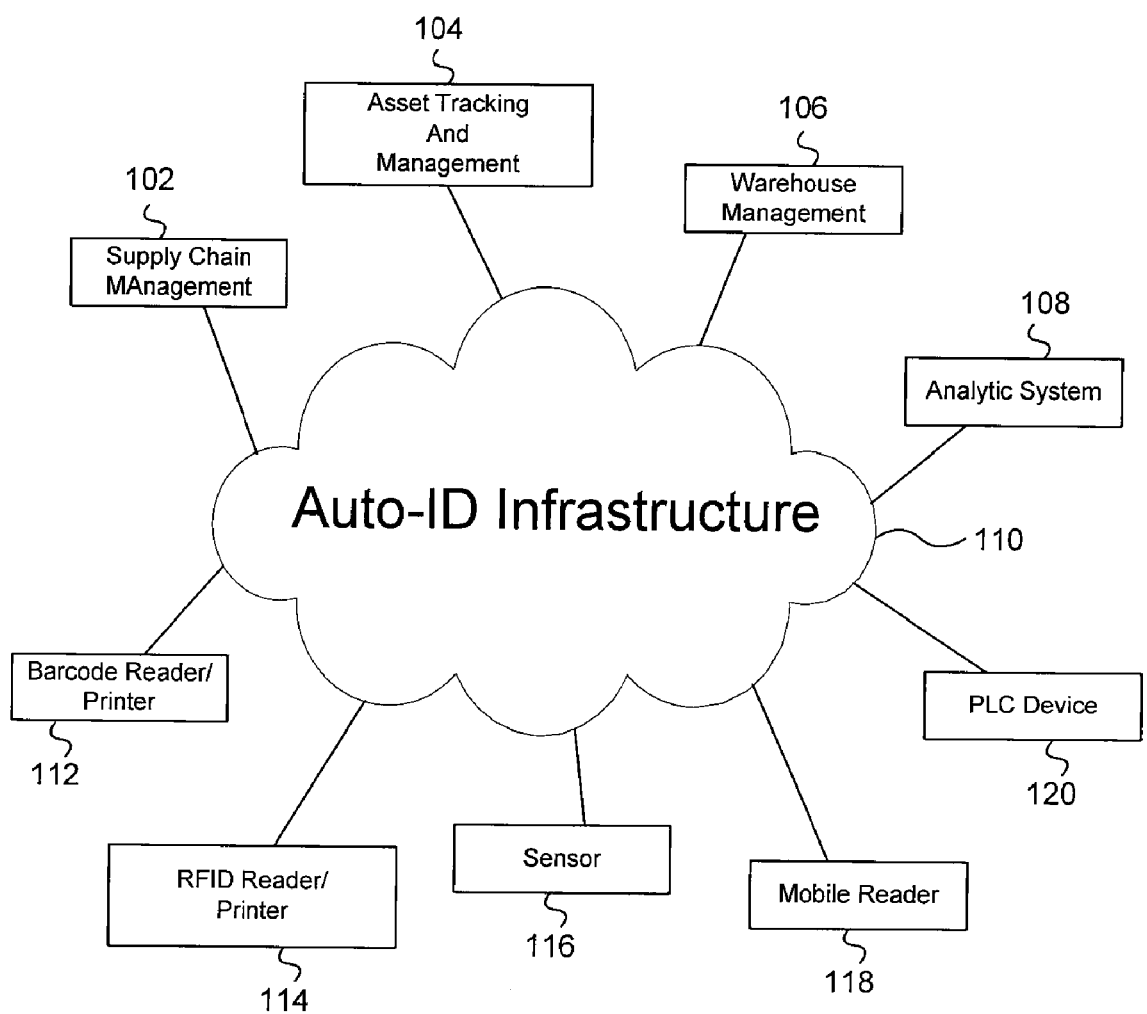
FIG. 1 is a network diagram of an auto-id system.

FIG. 1 is a network diagram of an auto-id system 100. In FIG. 1, a plurality of enterprise applications include, as examples, a supply chain management application 102, which may be used by the enterprise to oversee the process of producing/buying, shipping, and selling of the products or services of the enterprise. An asset tracking and management system 104 may be used, for example, to monitor and track a number of assets within or across a site, an organization, or across organizations, in order to determine what assets, e.g., inventory assets, are available or unavailable to, or desired by, the enterprise. A warehouse management application 106 may be used to oversee the receiving, stocking, selection, and shipping aspects of a warehouse. An analytic system 108 may be used to quantify aspects of the operations of the enterprise, such as, for example, speed of response to consumer requests, loss resulting from theft, or other factors that may impact a profit or operation of the enterprise.

The examples of enterprise applications illustrated in FIG. 1 illustrate the need of an enterprise to gather, share, and use data that is common to the enterprise systems. For example, the supply chain management application 102 may need to know how much of a certain type of asset is currently available, based on data within the asset management application 104. The analytic system 108 may extract data from the auto-id middleware and also from the other applications 102, 104, or 106, in order, for example, to discover performance issues (such as storage usage, or reasons for delivery delay), problems (such as product counterfeit patterns), and the general visibility of the physical object (item, case, pallet). The analytic system 108 may report the discovered results through a portal system.

Much of the data to be shared and used by enterprise applications, such as, for example, those just described, relates to the products or services that are bought and/or sold by the enterprise systems. In FIG. 1, information regarding theses products or services is obtained by the applications through the use of a middleware infrastructure 110, which implements an auto-identification (auto-id) system for automatically obtaining and sharing information related to the products and services to be bought and/or sold.

Generally, auto-id systems, as referred to above, enable the automatic gathering and use of information related to products sold or used by the enterprise, and include identifiers and readers for obtaining information about the identifiers. In FIG. 1, examples of auto-id elements include a barcode reader/printer 112, which may be used to read or print barcode labels (to be) attached to an object. An RFID reader/printer 114 is shown, which, as should be understood from the above discussion of RFID systems, may be used to read information from, or assign information to, an RFID tag attached to an object. A sensor 116 may refer to, for example, an environmental sensor (e.g., a thermometer), or a voice or an optical character recognition sensor. A mobile reader 118 refers, as its name implies, to a reader that may be carried by a user for detecting, for example, an RFID tag or other auto-id identifier. Finally in FIG. 1, a Programable Logic Controller (PLC) device represents a digital controller used for applications such as on/off control, timing, logic, counting and sequencing, and also may be controlled by a device controller system, described in more detail below.

As shown in FIG. 1, then, information obtained by any of the auto-id devices/systems 112-120 may be communicated to, shared between, and used by, any of the enterprise applications 102-108. In this way, the enterprise may obtain and use information that is essentially real-time, across an entire spectrum of its operations. Further, the enterprise may share information with other enterprises. For example, the supply chain management application 102 may be associated with a first enterprise (e.g., a retail store), while the warehouse management application may be associated with a second enterprise (e.g., a manufacturer). By obtaining information from the auto-id devices/systems 112-120, and sharing this and other information across the middleware infrastructure 110, the two enterprises may increase an efficiency of both of their respective operations.

Figure 2:
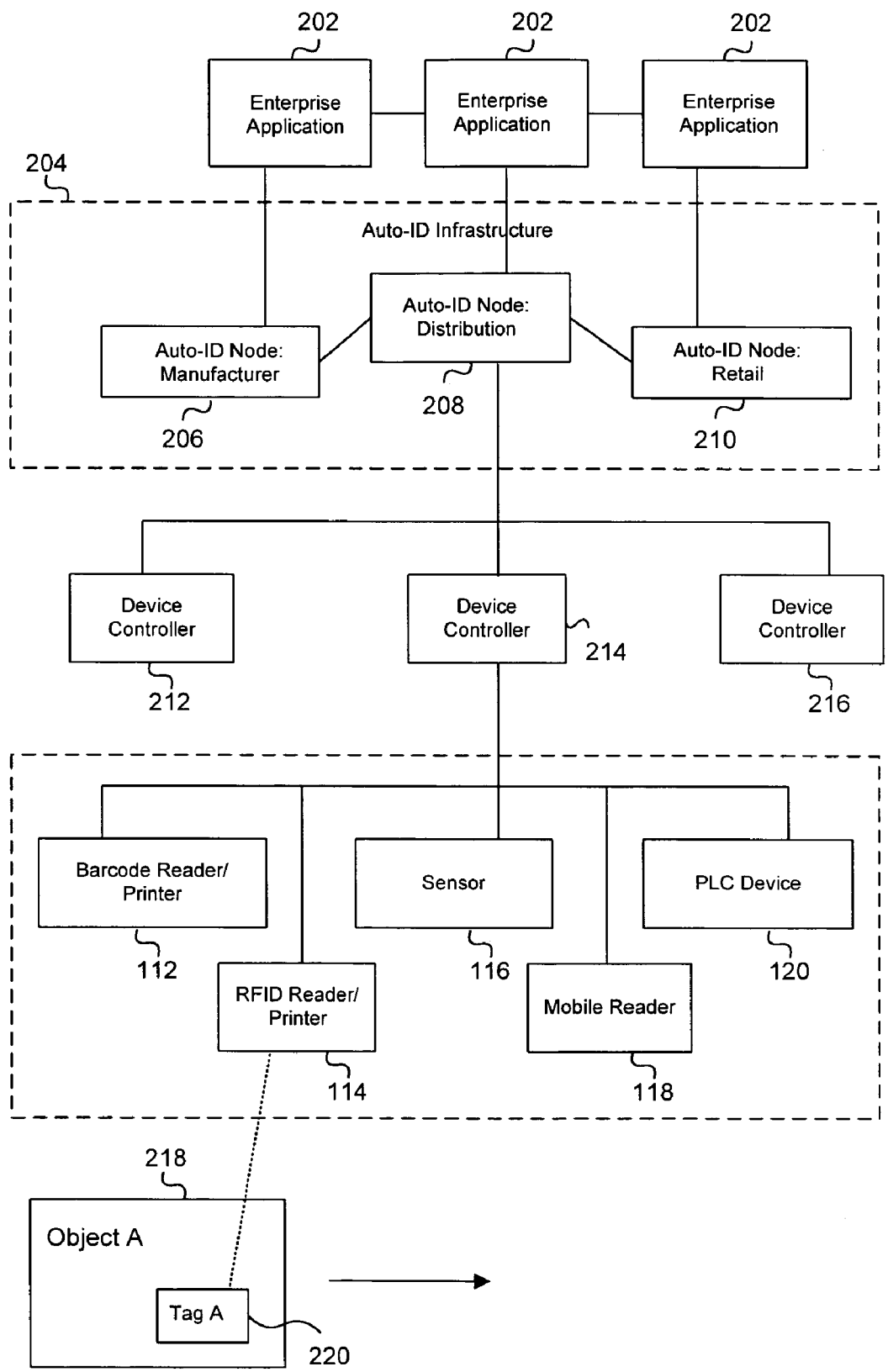
FIG. 2 is a block diagram of a system 200 illustrating examples of the auto-id features of FIG. 1, including an auto-id infrastructure having an auto-id node(s) and a device controller(s).

FIG. 2 is a block diagram of a system 200 illustrating examples of the auto-id features of FIG. 1. In FIG. 2, enterprise applications 202 may include the various applications 102-108 discussed above, as well as various other enterprise applications.

An auto-id infrastructure 204 represents some or all of the middleware infrastructure 110 of FIG. 1. In particular, the auto-id infrastructure 204 includes auto-id nodes 206, 208, and 210. The auto-id nodes 206, 208, and 210 generally represent nodes at defined locations that are designed to associate information obtained by the auto-id devices 112-120 with existing business logic or data. Further, the auto-id nodes 206, 208, and 210 may be used to store historical information for products or objects that have been tracked by the auto-id devices/systems 112-120. Such historical information may include, for example, status information at a particular time, object location, environmental information related to the tracked object(s), and information for multiple objects that has been collected and combined for a desired purpose.

The auto-id nodes 206, 208, and 210 may be strategically placed throughout the enterprise, or across multiple enterprises. For example, the auto-id node 206 may be located at a manufacturing site, while the auto-id node 208 may be located at a product distribution site, and the auto-id node 210 may be located at a retail store. In this way, information that is particular to an actual setting of an auto-id node may be obtained and retained only at that particular node.

For example, the auto-id node 210 at a retail store may be interested in tracking a retail price of an item, or a number of items on a shelf of the retail store. Such information may not be useful to the auto-id node 206 at a manufacturing location, but may be partially useful to the auto-id node 208 at the distribution location. For example, the auto-id node at the distribution location 208 may not be interested in the retail price of an item, but may be interested in a number of presently-shelved items (for purposes of re-stocking).

Similarly, business processes and business logic at the different sites may benefit from the use of the localized auto-id nodes 206, 208, and 210. For example, the retail auto-id node 210 may include a workflow for preventing theft of objects, while the manufacturing auto-id node 206 may be interested in monitoring a quantify of objects produced in a particular time period. Thus, by using a dispersed network of localized auto-id nodes, the system 200 may process information more efficiently, and in a manner that is more useful to the users at the various locations.

Each auto-id node in the system 200 generally includes one or more device controllers, illustrated in FIG. 2 as device controllers 212, 214, and 216, which are associated with the distribution auto-id node 208. Of course, each of the auto-id nodes 206, 208, and 210 may have fewer or greater numbers of device controllers, or may not use device controllers at all.

Referring to the device controller 214 as an example, FIG. 2 illustrates that the device controller 214 may be used to oversee and coordinate the operation of some or all of the auto-id devices 112-120. Of course, the device controllers 212 and 216 may be used to oversee the operations of similar auto-id devices that may be connected to those device controllers.

More specifically, the device controller 214 may be used to process data from the auto-id devices 112-120, so as to increase an efficiency of its associated auto-id node 208. For example, the device controller may remove extraneous information, or may combine or modify data in a manner specified by the auto-id node 208 in a way that is useful to the distribution function of that auto-id node, and/or in a way that is useful to the enterprise applications 202.

Thus, the device controller 214 coordinates and manages the auto-id devices 112-120, perhaps based on instructions from the auto-id node 208, and relays (processed) information from the auto-id devices to the auto-id node 208. For example, the auto-id node 208 may be used to instruct the device controller 214 to obtain a particular class of data (such as, for example, quantity) with respect to an object 218 (for example, a toy or other item to be distributed to retailers for sale). Then, the device controller 214 may use the RFID reader/printer 114 to obtain this information from a tag 220 associated with the object 218, and may then remove any undesired information that is concurrently obtained before passing on the information that a certain number of the object in question is available to the auto-id node 208.

As another example, the auto-id node 208 may instruct the device controller 214 to assign information to the object 218. For example, the device controller 214 may use the RFID reader/printer 114 to change a current price of the object 218 (e.g., to store new price information on, or in association with, the RFID tag 220 attached to a certain class of object).

From FIG. 2, it should be understood that, just as each of the device controllers 212, 214, and 216 may be used to filter, aggregate, write, or otherwise manipulate data with respect to all of its associated auto-id devices and/or environment devices 112-120, the auto-id node 208 is operable to filter, aggregate, assign, or otherwise manipulate data for its associated device controllers 212, 214, and 216. In this way, the auto-id node 208 may integrate information from its device controllers 212, 214, and 216 with business processes that may be operational on one or more of the enterprise applications 202.

By extension, it may be seen that the enterprise applications 202 are operable to aggregate information from all of the auto-id nodes 216, 218, and 210. Further, it should be understood that information that is useful at one level of the system 200 may not be as useful at another level. For example, the enterprise applications 202 may not be interested in, or able to use, low-level (e.g., item-level) information that is collected by the reader/printer 114. Rather, the enterprise applications 202 may only be interested in that information to the extent that the information is filtered and/or aggregated by the device controller 214 and/or the auto-id node 208.

As a result of the described architecture, it should be understood that business logic from the enterprise application 202, and/or from multiple enterprise applications, may be supported in the auto-id middleware 110. Further, such multiple enterprise applications may be supported with a single physical hardware system and a single auto-id middlware that are common to all of the enterprise applications.

Figure 3:
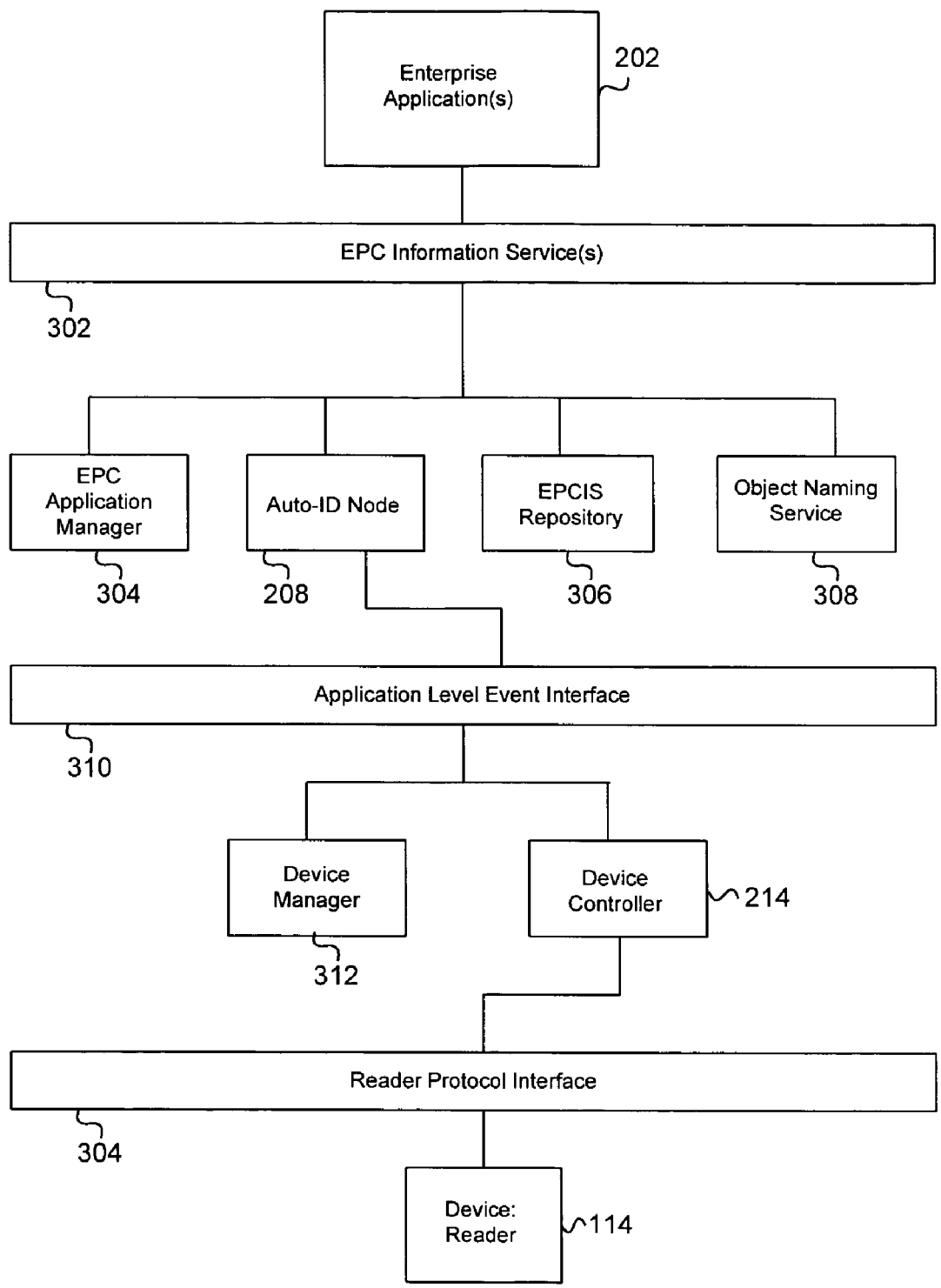
FIG. 3 is a block diagram of a network architecture for use with the auto-id infrastructure of FIG. 2.

FIG. 3 is a block diagram of a network architecture 300 for use with the auto-id infrastructure 204 of FIG. 2. More specifically, FIG. 3 illustrates an architecture by which the auto-id infrastructure 204 of FIG. 2 may be used with an Electronic Product Code (EPC) that has been developed for use with auto-id systems.

The EPC refers to a unique number, similar to a Uniform Product Code (UPC) identifier, that has a pre-defined format and scheme which multiple organizations and enterprises have agreed to use in uniquely designating and identifying their respective products, goods, or services, or collections thereof (e.g., pallets, cases, or truck-loads). In the context of RFID systems, then, the EPC may be assigned to the tag 220 on the object 218 of FIG. 2. A classic EPC, for example, is defined by four fields: header field (to distinguish different formats), manufacture field (each organization that assigns the EPC has its own manufacture field), product field (product code), and serial number (with the product).

In FIG. 3, an EPC Information Services (EPCIS) layer 302 allows the exchange of EPC data over a network. That is, EPCIS provides a standard format or protocol by which a reader that has identified an EPC number may find and use information about that number (and hence, about its associated item). In some implementations, and/or in related implementations, a language such as, for example, the Physical Mark-up Language (PML) and/or the extensible Mark-up Language (XML) may be used for the above-described transfer and use of business-level EPC information The EPCIS layer 302 receives information from an application manager 304, which is generally operable to oversee information events (e.g., tag reads) and manage the events for communication to the EPCIS layer 302 and thereby to an EPCIS repository 306. The application manager 304 operates to monitor and configure the repository 306 as the repository 306 accumulates data over relatively long periods of time during which the data may not be immediately useful to any particular application or device. Generally speaking, a flow of information for a number of objects may be too great for the repository 306 to be practically useful in real-time, particularly given potential network delays. Rather, the auto-id node 208 of FIG. 2 may be used to track such information, perhaps for some fixed period of time, that may be immediately useful to the auto-id node 208.

The application manager 304 and EPCIS layer 302 have access to an Object Naming Service (ONS), which, similarly to a Domain Name Service (DNS), is a look-up service that allows the application manager 304 and EPCIS layer 302 to find information about a product, based on the EPC code for that product. The ONS 308 may have different levels of information, which may be classified, for example, by whether the information is stored locally or non-locally to the product.

An application level event (ALE) interface layer 310 provides an interface to a device manager 312 and the device controller 214. More specifically, the ALE interface layer 310 may be used to filter or aggregate information events, as received from the device manager 312 and/or the device controller 214. The device manager 312 may be used to manage a status and/or configuration of the device controller 214.

Also in FIG. 3, a reader protocol interface layer 314 provides an interface for the device 114. That is, it should be understood that different enterprises may employ different types of the device 114, or other auto-id devices, and these devices and enterprises may make use of different reader protocols for communicating with the readers. The reader protocol interface 314 is designed to enable communication with all readers within the system 300.

It should be understood from FIG. 3 that the system 300 may be used without the auto-id infrastructure 204 of FIG. 2, and, conversely, the auto-id infrastructure 204 of FIG. 2 may be used without other elements of FIG. 3. Thus, FIG. 3 illustrates that the auto-id infrastructure 204 of FIG. 2 may be used with, but does not require the use of, the EPC network and standard.

Figure 4:
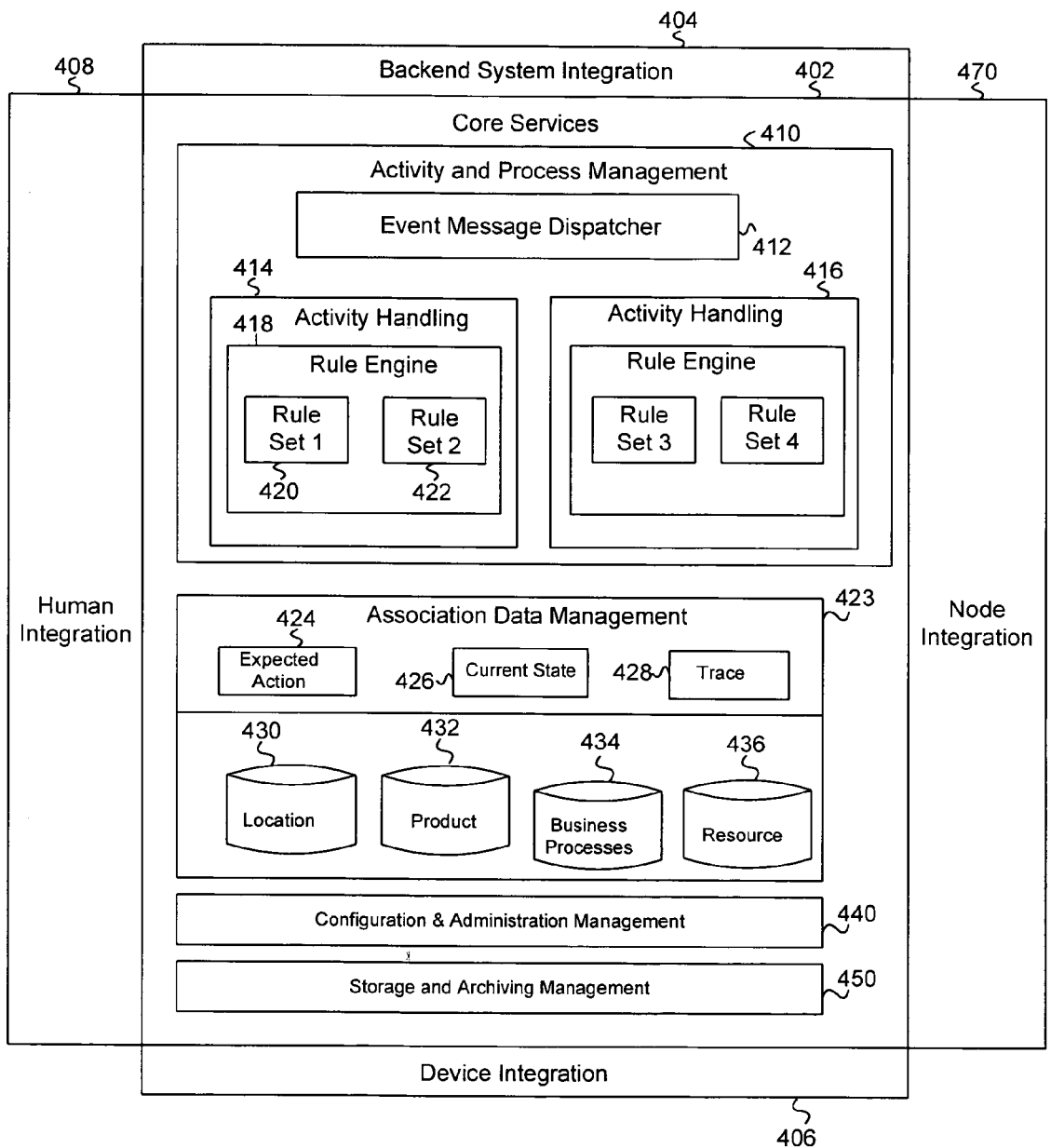
FIG. 4 is a block diagram of the auto-id node(s) of FIGS. 2 and 3.

FIG. 4 is a block diagram of the auto-id node(s) 206, 208, and 210 of FIGS. 2 and/or 3. In FIG. 4, a core services module 402 handles implementation details of, for example, the auto-id node 208, as discussed in more detail below, while various integration modules 404, 406, 408, and 470 handle communication, configuration, and management details of the core services module 402 relative to external features, users, and services.

For example, the backend system integration layer 404 handles communication between the auto-id node 400 and backend systems, such as, for example, the applications 102-108 of FIG. 1, or the application 202 of FIG. 2.

The device integration layer 406 handles communication between the auto-id node 400 and devices. For example, the device integration layer 406 may enable communications between the node 208 and the device controller 214 of FIG. 2. In some implementations the device integration layer 406 may enable communications directly with one or more of the tracking devices 112-118.

The human integration layer 408 handles communication between the auto-id node 400 and user interfaces. For example, an auto-id node operator may configure an auto-id node to perform certain tasks through a user interface, or monitor the information that the auto-id node receives. The operator also may obtain alert messages from the auto-id node in case of, for example, an unexpected event or a malfunction. Further, security of the auto-id node 400 may be monitored, so that only authorized personnel may interact with the auto-id node 400.

The node integration layer 470 handles communication between the auto-id node 400 and other auto-id nodes. For example, multiple neighboring auto-id nodes together may track an object through a distribution or supply chain, in order to provide routing information for the object, or to determine whether additional units of the object should be purchased or stocked.

The node integration layer 470, along with the backend system integration layer 404, the device integration layer 406, and the human integration layer 408, will be described in more detail below under the heading "Integration Layers".

The core services module 402 includes an activity and process management module 410. The activity and process management module 410 analyzes information associated with an event experienced by an object, such as, for example, a read or tracking event in which tag information is read from (for example) the tag 220 of object 218 by the RFID reader 114 in FIG. 2. Then, the activity and process management module 410 matches this information with known information that is related to the particular object.

For example, as described in more detail below, each tracked object may be associated with one or more business processes, also referred to as, for example, a business process model(s), or a workflow(s). Such processes generally describe all known or anticipated possibilities that may be experienced by an object during some or all of its lifetime, i.e., from manufacturing to distribution, or from distribution to retail sale, or from manufacturing to retail sale. In this sense, the auto-id node may require all of the lifetime information for a particular object, or may require only some sub-set of the lifetime information, depending on the duties of the particular auto-id node 400.

Thus, actual, current event information (e.g., information read from the tag 220 by the reader 114), combined with previously-detected event information, as well as anticipated event information (derived from the relevant business process model), allows the auto-id node 400 to make a determination regarding a status of the tracked object(s). In this way, the auto-id node 400 is able to move an object through a supply chain, or some other business model (e.g., a customer return of merchandise), in an efficient, cost-effective manner, with minimal human intervention or supervision.

The activity and process management module 410 includes an event message dispatcher 412. The event message dispatcher 412 receives events from different sources, where, as referenced above, the term event generally may refer to an occurrence triggered by an activity of, for example, one or more of the tracking devices 112-118 of FIG. 1.

In some implementations, such events may be represented as software/data packets that are received at the event message dispatcher 412 from any number of sources. In addition to the tracking devices 112-118, an event may be received from a local operator by way of the human integration module 408. Events also may be received from, for example, the backend system 404, or from another auto-id node.

These different sources of the events may share a same or similar format in describing the various events. For example, the different sources of events may use a universal event descriptor protocol to describe the event. The event description may include, for example, a designated an object identifier, an event type (e.g., a RFID read event), an event source (e.g., the RFID reader 114), a time stamp, a location of the event source, an event subject identifier, or other information.

As one specific example, the reader device 114 may send an event of type "scanning," from a RFID reader having an id "abcd1234," associated with time "10:23AM Dec. 21, 2004," and having an object-specific identifier that is unique to the object that was scanned. In this way, events from different sources may be received in the event message dispatcher 412 in a compatible format, so that the event message dispatcher 412 may handle the incoming events in the same or similar manner, regardless of the source(s) of events.

The event message handler 412 analyzes some or all of the information referenced above, or other information, and dispatches the incoming events to one or more activity handlers 414 or 416, accordingly. For example, an event may be dispatched to one of the other activity handlers 414/416 based on the type of the event, (e.g., a device reader event, or a neighboring auto-id node event, or a backend system event), the time of the event (e.g., whether the event is a day time event or a night time event), or virtually any other criteria by which the activity handlers may be delegated to handle the events.

The activity handler 414/416 analyzes the information about an event contained therein, along with any known data that may be associated with the event and accessed when needed, and compares this information with a determined business process(es) associated with the object of the event. In so doing, the activity handler 414/416 operates to determine one or many future actions that should be taken, if any, in response to the event.

Once determined, the future actions may be communicated outside of the auto-id node 400 for execution thereof. For example, the future actions may be communicated through the integration interfaces 404, 406, 408, and/or 470. In this way, for example, a human operator may be required to perform some action, or an alert may be raised, or a separate auto-id node 204, 206, 208 (or back-end enterprise applications 102-108/202, or device 112-120) may be notified of some required activity. The activity handler 414/416 also may update its own status and/or tracking data with respect to the object, in order to reflect the changes represented by the event(s), and to more accurately reflect where the object stands in the business process.

The business process that are associated with the object may be represented in a set of rules, and/or as part of a workflow model that may be associated with the object, and perhaps other objects. For example, a rule may be similar to a conditional clause, stating the different actions to be taken in response to particular conditions or circumstances. That is, a rule may state that if one or more conditions is met with respect to a received event, then one or more action(s) should be taken in response. Types of conditions, decision-making processes, and responsive actions are discussed in more detail below.

To implement such rules, the activity handler 414 includes a rule engine 418 that applies rule sets 420 and 422 to the incoming events at the activity handler 414. The rule engine 418 provides an architecture for programmable rule sets to be applied to events received at the auto-id node 400. The rule engine 418 may, for example, implement a mechanism to search one or more rules in the rule sets 420/422 that may be applied to a received event.

For example, the rule engine may parse the event (that may be formatted in a universal event descriptor protocol, as referenced above), and may calculate and match the selective criteria of each rule set and/or rule to find one or many applicable rule(s). The rule engine 418 also may include a mechanism to execute a rule by activating actions on other parts of the core services 410, and/or communicating action requests on the external modules, users, and services through backend system integration 404, device integration 406, human integration 408 and Node integration 470.

As one example, the event message dispatcher 412 may determine that an incoming event is related to a received shipment of a certain class of devices at a certain location (e.g., a particular docking bay at a warehouse), and may dispatch the event to the activity handler 414, which may be assigned the handling of such events. The activity handler 414 may determine that the event is related to a certain object, and/or has other characteristics (e.g., occurred during a night-time shipment), so as to determine that the rule set 420 within the rule engine 418 is the appropriate rule set to be applied to this type of event. Then, the rule set 420 may be applied to analyze the received event and thereby match a conditional clause of each rule(s) with the information received with respect to the event, along with (possibly) other information, and, if there is a match, may apply the rule to determine the future or expected actions to be taken with respect to the event and the corresponding object.

The rule engine 418 is scalable, so that more rule sets may be added to the rule engine without disruption of its function. Moreover, the rule engine 418 is flexible, so that existing rule sets may be removed or deactivated, for example, at run time or when no longer needed. The rule set 420 may, for example, be assigned to the activity handler 414/416 by the backend system by way of the backend system integration module 404, or from one of the other interface modules 406, 408, or 470. Rules also may be added from other auto-id nodes, or from the EPCIS repository 306 of FIG. 3, or from some other source. Since the rule sets 420/422 are modular, they may easily be replaced or modified, without disrupting operations of other rule sets.

As referenced above, the rule engine 418 receives an object-specific event and associates the event with a business process, so as to determine a future or expected action, if any, for the object associated with the event. In so doing, the rule engine 418 may have access to additional data that may be helpful in performing the matching operation. In particular, within the core services 402, an association data management module 423 communicates with the activity and process management module 410, and stores (or accesses) data and services that may be useful in the implementation of the rule sets 420 and 422 by the rule engine 418.

For example, the association data management module 424 may work closely with the activity handler 414,416 to keep track of the life cycle of each event object, or a portion thereof, and may update the status of the event objects in real-time, in response to receiving event. For example, the association data management module 423 may include data about the object as it progresses through its lifecycle from, e.g., manufacturing to retail sale, or from a return of the object until the object is re-packaged for retail sale as a refurbished object.

The association data management module 423 generally tracks two classes of data regarding a particular object(s). Specifically, dynamic data refers to data that is changing in time, or that may be expected to change, or that has changed as the associated object moves through time. Conversely, static refers to data that generally is not changing in time, or that is changing only infrequently. Different parameters may be considered to by dynamic or static, depending on the object and business process(es) being tracked. For example, an object's location may be considered dynamic, while an object's color or weight may generally be considered static. However, it is possible for an object's color to change, particularly during a manufacturing process, in which case color may be considered a dynamic quality.

Thus, the dynamic data represents the object as it moves through a defined lifecycle or timeline. For example, dynamic data is generally represented in FIG. 4 as including three components: an expected action 424, a current state 426, and a history 428. The expected action 424 includes the expected future events, or possible future events, for an event. Thus, the current state 426 may include the current state of an event, and the history 428 may include a list of past events experienced by the event objects.

As these components are dynamic, the associated data may be modified in response to events that are received with respect to a particular object. For example, the three components 424, 426, 428 may be updated by the activity handler 414,416 each time an event is received. Specifically, if an event triggers a reception of an object at a loading dock, then the object's current state may be changed from "in transit" in the current state 426 to "received." Then, the previous current state entry may be moved to the history 428, to represent the transit history of the object (e.g., a route traveled during transit). An expected action of "received" in the expected action 424 is re-designated as the current state 426, and the rule engine 414 may use the rule set 420 to determine which of the expected actions still within the expected action 424 should be implemented next (e.g., unloading the object for stocking on store shelves).

The dynamic data may thus be altered at least as often as events are received with respect to a particular object. The number and frequency of events are generally related to a number and availability of readers, so that, in the theoretical limit, an object that is continuously tracked during its lifetime by a large enough number of readers could have dynamic data that changes on a continuous basis.

In contrast, static data is stored within the association data management module 423 within databases or memory that are not generally expected to be required to update on a regular or continuous basis. Rather, the association and data management module 423 may communicate with outside sources to update the static data on a periodic or semi-periodic basis. Accordingly, such static data may not generally be expected to change in response to an event (although this may happen in some circumstances).

For example, a location database 430 may include an address of a loading dock, as well as addresses for possible sources of shipments that arrive at that loading dock. It should be understood that some location information may be considered dynamic (e.g., a current location of an object in transit), while other location information may be considered static (e.g., a manufacturing facility at which a particular object was made). In general, though, the static information will be considered not to change on an event-by-event basis.

Similarly, a product database 432 may include detailed descriptions of the products or objects that are being trackfed, including such descriptions that change, but that, again, do not generally change on an event-by-event basis. The product database 432 may store such information, or may look up the information from an outside source, using, for example, a universal product id (e.g. the EPC code read from the tag 220 of the object 218).

A business process database 434 may include one or more business processes that are associated with the object. As referenced above, a business process may refer to a formalized workflow or progression of tasks/events that is designed to govern a lifetime of an object. For example, a business process model may be formalized for a manufacturing process, or for a distribution process, or for a customer return of defective merchandise process.

In such cases, the business process model may be designed at an abstract level at, for example, the back-end system 202, to govern a lifecycle of multiple objects through an entirety (or large portions) of their respective lifecycles. Then, specific sub-sets or instantiations of the business process model (s) may be implemented or monitored at the auto-id node 400, so that the business process model for a particular object represents the lifecycle and possible (anticipated) events that the object may experience. A particular example of this type of implementation is discussed below with respect to FIG. 6.

In other examples, there may not be a business process model or workflow that is defined at this level, and the rules, the dynamic data, and the static data may implicitly define the business process that will be experienced by the object.

A resource database 436 may include other resources for the event. For example, the resource database 436 may include resources that are available for implementing whatever action is required in response to an event. For instance, if an object is received at a warehouse that requires a special device for transporting the object, then the resource database 436 may store information regarding such a moving device that may be available on the premises of the warehouse. Similar comments apply to other resources that may be useful in the management of objects throughout their lifecycle, so that, generally, whenever the rule engine 418 determines that an action is required, the resource database may be consulted to determine what resources are available for implementing that action.

Although the above implementations are discussed with respect to the division of dynamic data and static data, it should be understood that this division is merely one example. For example, the databases 430-436 may be used to store some or all of the dynamic data in addition to the static data, and, in this case, may simply be updated with the dynamically-changing data more frequently than in the above examples. For instance, to the extent that location data may represent either dynamic or static location information, as referenced above, then it should be understood that the location database 430 may be thought of as containing dynamic and/or static data.

The core services 402 also includes a configuration and administration management module 440 to configure and manage the auto-id node 400. For example, administration management module 440 may allow a user to upload more rule sets 420,422, manage the integration logic with respect to modules 404-408, or establish connections with outside services (e.g., to update the static data storage 430-436). Finally in FIG. 4, a storage and archiving management module 450 manages the data storage and archiving of the core services module 410. For example, the module 450 may be used to archive data that is used infrequently, or that has not been used for some pre-determined time. In so doing, the module 450 may interact with an external storage site, so as to minimize resources needed at the auto-id node 400.

The above description of FIG. 4 is given with respect to the example of a timeline of a particular object or group of objects, where expected actions of the object(s) are matched with actual events. However, it should be understood that the rules, the timeline(s), and the other criteria may be implemented in terms of other parameters.

For example, rather than being object-specific, the auto-id node may operate with respect to a particular reader, or set of readers. For example, one reader may detect events from a plurality of objects' identifiers, so that the history 428, current state 426, and expected actions 424 may be defined with respect to the reader, and not with respect to any particular object read by that reader.

For instance, a Christmas display may sell many Christmas-related objects, and a reader may be located proximate to the objects to determine when the display is becoming depleted. In this example, the activity handler 414 may handle all activity that occurs with respect to the specific reader, and the rule set 420 may designate parameters for, for example, re-ordering inventory from a back room or from a manufacturer, or for replacing one type of object with another when the first type of object is sold out.

Thus, although the activity and process management module 410 may operate according to a number of different parameters and guidelines, it should be understood from the description and examples contained herein that the activity and process management 410 is operable to determine an expected or future event, and to wait until a corresponding event arrives that matches the expected event. In so doing, the activity and process management module 410 may process a number of events that do not match any expected events, in which case an alarm may be triggered, or, otherwise, no action need be taken.

Integration Layers

Figure 5A:
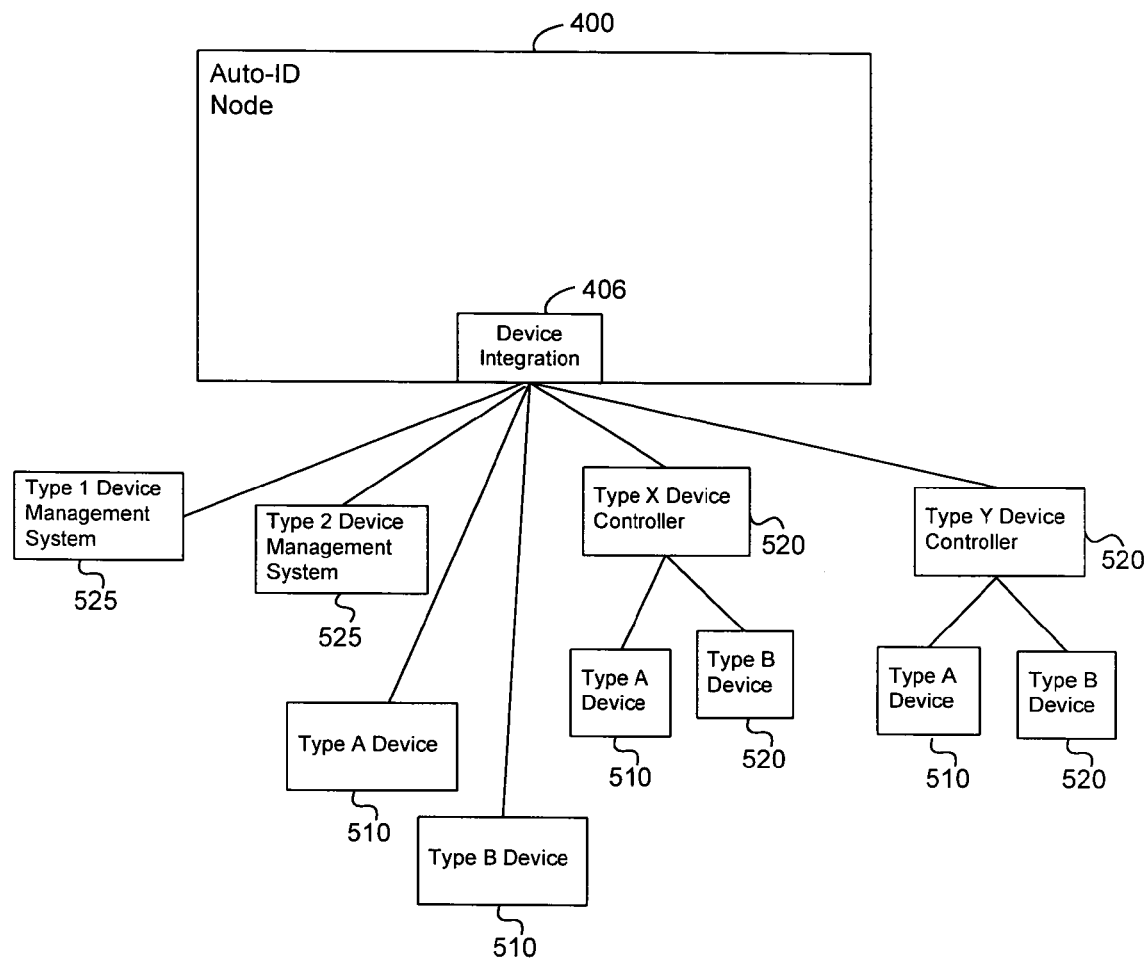
FIG. 5A illustrates device integration.

As previously described, the device integration layer 406 handles communication between an auto-id node 400 and multiple devices. As shown in FIG. 5A, the devices can include different types of automatic data acquisition devices 510, device controllers 520 and device management systems 525. As shown in FIG. 5A, the auto-id node 400 can communicate with a particular device 510 directly, or through a device controller 520.

The data acquisition devices 510 can include both periodic devices and aperiodic devices. Periodic devices are devices that emit periodic data streams. Aperiodic devices are devices that emit aperiodic data streams. A periodic stream is a continuous stream of data occurring at regular time intervals (e.g., one data value every n milliseconds), as opposed to an aperiodic stream, where data is emitted at irregular intervals, for example, only when a tagged item is detected. Examples of periodic devices are sensor devices for measuring one or more physical properties (for example, temperature, humidity, acceleration, pressure, light, position, movement or noise), and servers that provide continuous data feeds (for example, of stock information). An example of an aperiodic device is an RFID (Radio Frequency Identification) tag reader. Examples of specific types of RFID tag readers are readers manufactured by ALIEN TECHNOLOGIES® of Morgan Hill, Calif. and readers manufactured by MATRICS INCORPORATED® of Rockland, Md.

As previously described, a device controller 520 is software operable to manage one or more of the automatic data acquisition devices 510 and to relay data emitted by the automatic data acquisition devices 510 to an auto-id node 400 based on instructions from the auto-id node 400.

A device management system 525 monitors the condition of devices and/or device controllers and notifies the auto-id node 400 about the current condition. The notification can occur periodically or when the condition is abnormal. The device management system 525 can also support remote management, such as firmware uploading and system reconfiguration.

Figure 5B:
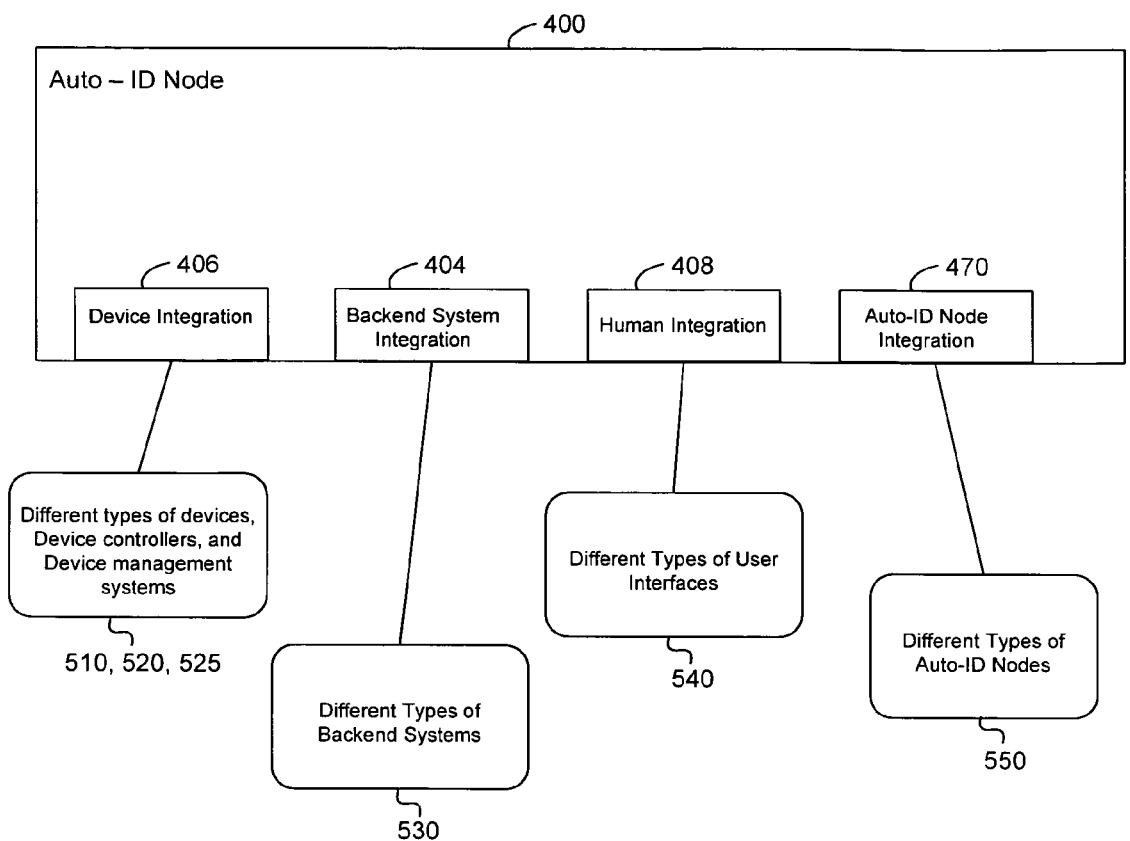
FIG. 5B illustrates device integration, backend system integration, human integration, and auto-id node integration.

As shown in FIG. 5B, the backend system integration layer 404, the human integration layer 408, and the node integration layer 470 of the auto-id node 400 handle communication with different types of backend systems 530, user interfaces 540, and auto-id nodes 550, respectively.

The different types of backend systems 530 can include logistic systems, asset tracking and management systems, maintenance service systems, warehouse management systems, financial systems, analytical systems and reporting systems. Furthermore, taking warehouse management systems as an example, there can also be different implementations, for example, an ORACLE® implementation and an SAP® implementation.

The different types of user interfaces 540 can include web-based or other server-based user interfaces, stand-alone user interfaces, and mobile interfaces. The user interfaces 540 can also be configured differently for different users.

The auto-id nodes 550 can include nodes located in different geographic locations. Taking a supply chain example, the nodes can be located in a manufacturing site, a distribution center and a retail center. The auto-id nodes 550 can include nodes of different auto-id systems developed by different companies, for example, EPCIS Server, available from Verisign of Mountain View, Calif. and Auto-ID Node, available from SAP AG of Walldorf (Baden), Germany.

In this specification, devices 510, device controllers 520, device management systems 525, backend systems 530, user interfaces 540, and auto-id nodes 550, will be referred to as auto-id components.

The auto-id components can differ in a variety of ways, including, but not limited to, the type of communication protocol, communication channel, communication mode, or messaging format used. For example, some of the auto-id components may communicate using HTTP (Hypertext Transfer Protocol), while others may communicate using a socket-based communication protocol, for example, TCP/IP (Transmission Control Protocol/Internet Protocol). Each general type of communication protocol can also have several different variations. For example, one well-known variation of HTTP is secure HTTP (HTTPs).

For TCP/IP, the communication channel can be a publisher-subscriber channel, a point-to-point channel or a socket channel. Examples are MQSERIES® available from IBM® of Armonk, N.Y., SONICMQ® available from SONIC SOFTWARE CORPORATION® of Bedford, Mass., WEBLOGIC® Server available from BEA SYSTEMS®, of San Jose, Calif., and XI®, available from SAP AG® of Walldorf (Baden), Germany. Most of the systems above support both the publisher-subscriber and the point-to-point channels.

For HTTP, the communication channel can be SOAP (Simple Object Access Protocol) and JSP (Java Server Pages).

The communication mode can be an on-line communication mode or an off-line communication mode. In the on-line communication mode, the auto-id node and the auto-id component maintain a continuous connection. That is, even when the auto-id node and the auto-id component are not sending messages to each other, the connection remains open. In the off-line communication mode, the auto-id node and the auto-id component do not maintain a continuous connection with each other. Instead, they only connect temporarily, for example, only to send a message, or only when network access is available. The off-line mode can be used by mobile devices or mobile user interfaces, for example.

Without the integration layers 404, 406, 408, 470, the auto-id node 400 would only be able to support a particular communication protocol, communication channel, communication mode, and/or messaging format, and would not be able to integrate with auto-id components that do not use the particular communication protocol, communication channel, communication mode, and/or messaging format supported by the auto-id node 400.

With the integration layers 404, 406, 408, 470, the auto-id node 400 can integrate with a variety of different types of auto-id components that use different communication protocols, communication channels, communication modes and/or messaging formats. In addition, as will be described below, the layers 404, 406, 408, 470 can easily be extended to accommodate new types of auto-id components that are developed in the future.

Figure 6:
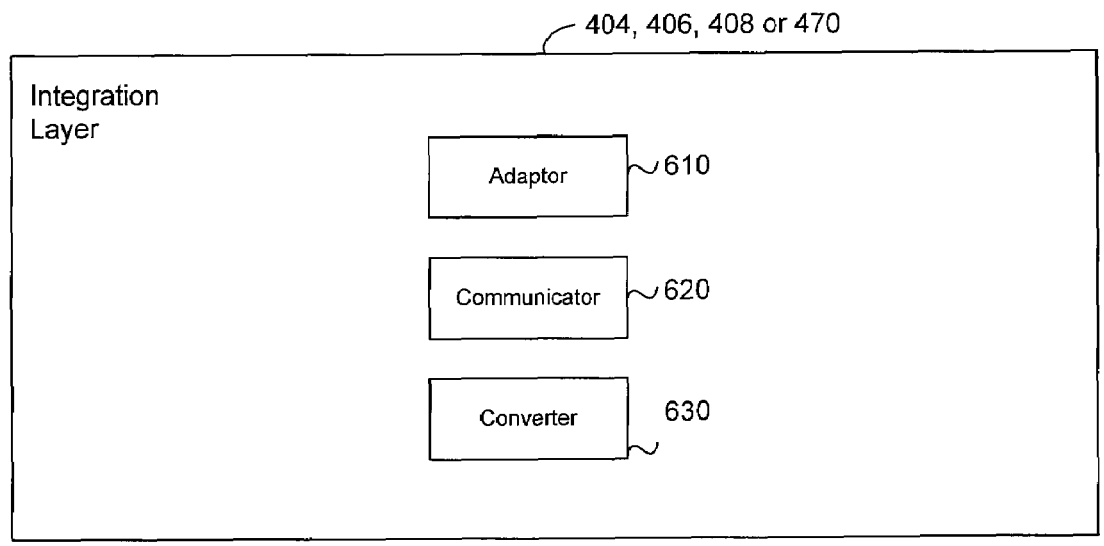
FIG. 6 illustrates an integration layer.

As shown in FIG. 6, each of the integration layers 404, 406, 408, and 470 includes an adapter 610, a communicator 620, and a converter 630.

The adapter 610 handles communication between the auto-id node 400 and the auto-id components. The adapter 610 uses the communicator 620 and the converter 630 to handle the communication.

The communicator 620 handles the data transport aspect of the communication. The communicator 620 supports a variety of different types of communication protocols, communication modes, and communication channels, including, but not limited, to the communication protocols, communication modes, and communication channels described earlier.

The converter 630 handles the data conversion aspect of the communication. The converter 630 converts data received from a connecting auto-id component into an internal message format understood by the auto-id node 400. Conversely, the converter 640 also converts data from the auto-id node 400 into an external message format understood by the connecting auto-id component.

Figure 7:
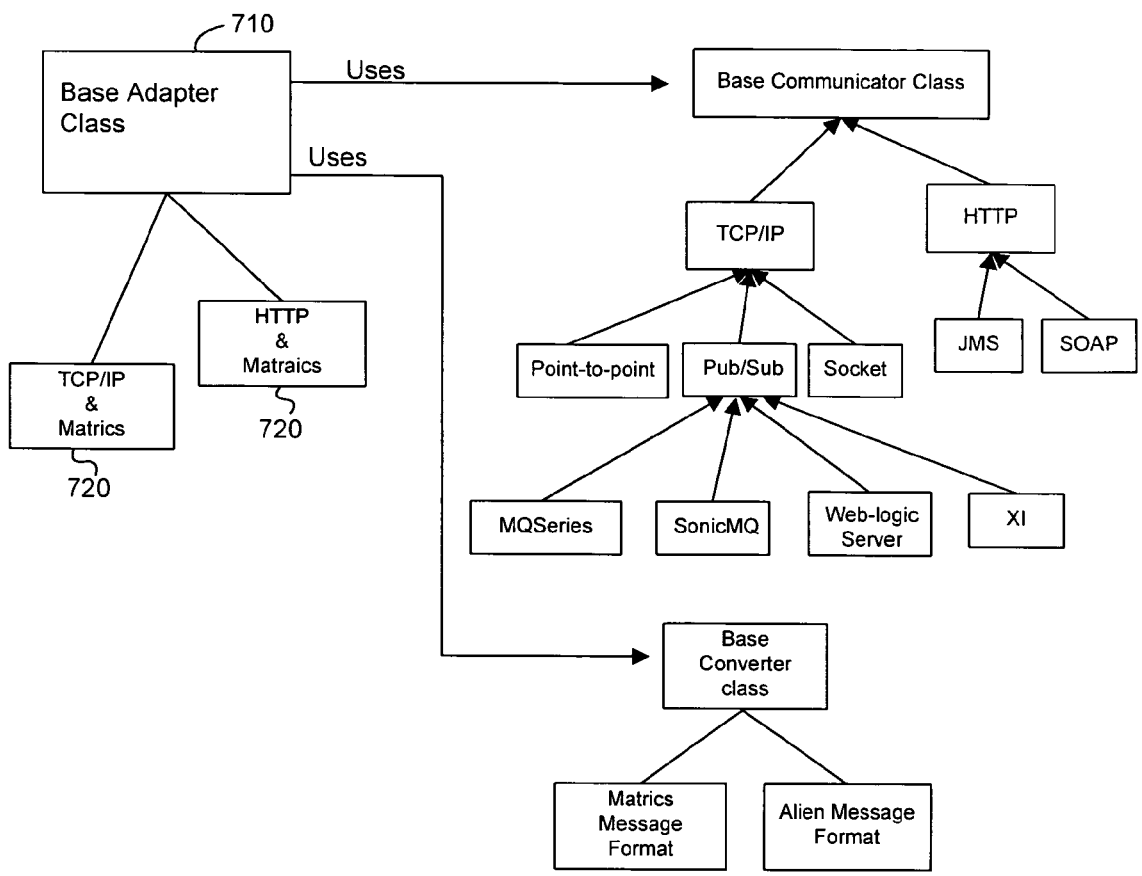
FIGS. 7 and 8 illustrate an object-oriented implementation of the integration layer.

As shown in FIG. 7, in an object-oriented implementation of the integration layers 404, 406, 408, 470, the adapter 610 can be represented by a base adapter class 710 and one or more specific adapter classes 720. The base adapter class 710 implements the functionality generic to all of the specific adapter classes 720. The specific adapter classes 720 extend the generic functionality with additional functionality that supports specific communication protocols, communication channels, communication modes and messaging formats.

The communicator 620 and the converter 630 can also be implemented using a similar set of base classes and specific classes. By separating the functionality of the integration layers 404, 406, 408, 470 into base classes and specific classes, the generic integration layers 404, 406, 408, 470 can be easily extended to accommodate additional specific communication protocols, communication channels, communication modes and messaging formats.

Figure 8:
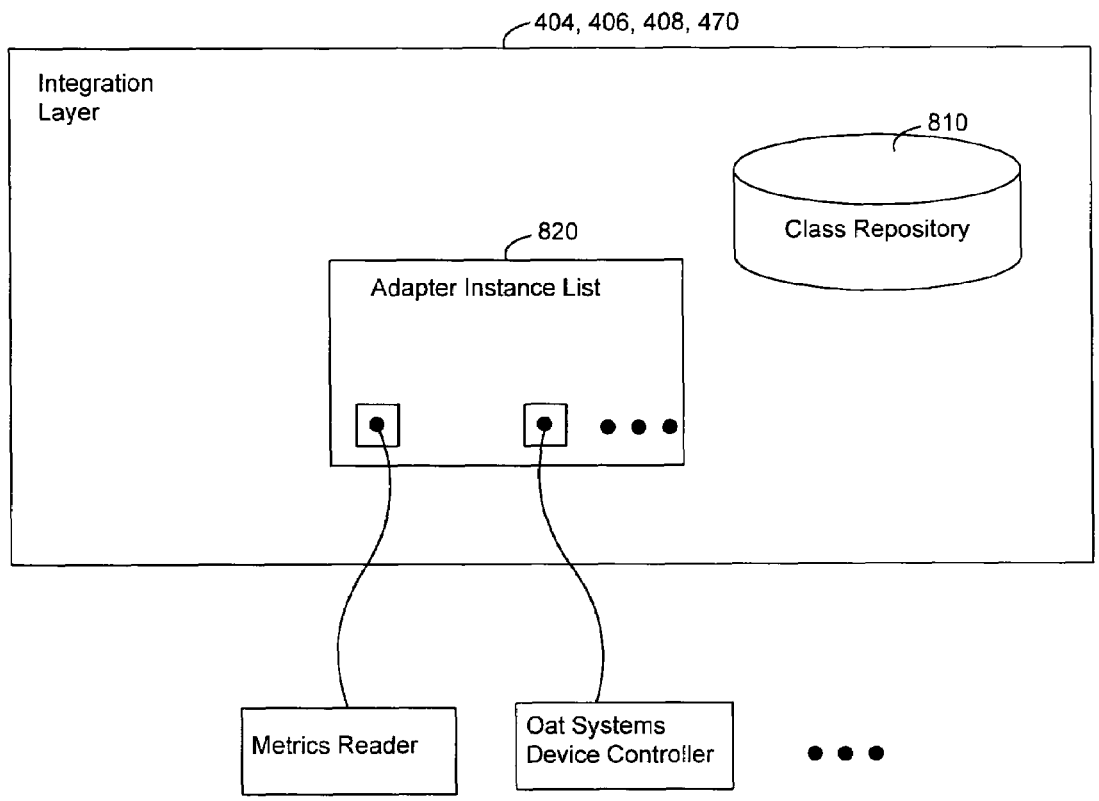

As shown in FIG. 8, the classes implementing the adapter 610, communicator 620, and converter 630 can be stored in a class repository 810. The class repository 810 can be located within the integration layers 404, 406, 408, 470 (as illustrated), or alternatively, can be located at a separate location accessible to the auto-id node 400.

For each auto-id component to be connected to the auto-id node 400, an instance of the adapter 610 is generated and added to an adapter instance list 820 maintained by the integration layers 404, 406, 408, 470.

The generation of an appropriate adapter instance for a given auto-id component can be performed manually by a human operator. The human operator can examine the auto-id component and then generate an adapter instance that supports the specific communication protocol, communication channel, communication mode, and/or messaging format of the given auto-id component.

Figure 9:
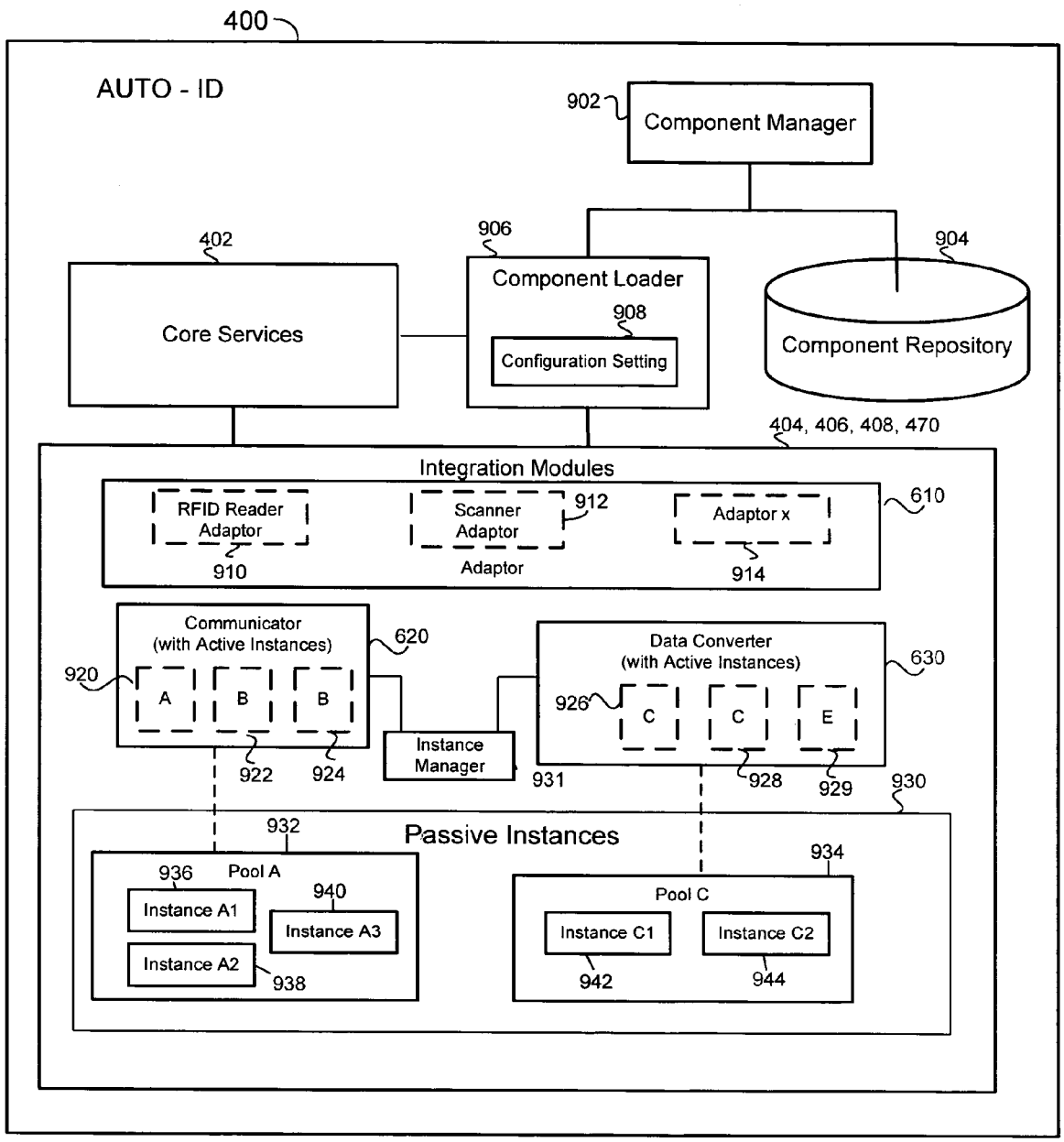
FIG. 9 is a block diagram of an implementation of the auto-id node of FIG. 4.

FIG. 9 is a block diagram of an implementation of the auto-id node 400 of FIG. 4. As discussed in FIG. 4, the auto-id node 400 includes a core services module 402 that processes event messages. The core service module 402 may include the event message dispatcher 412, the activity handler 414/426, the rule engines 418, the rule sets 420/422, and the data management module 423. The core services 402 also may include other modules that handle the same or different processes of the auto-id node 400. The auto-id node 400 also includes a number of integration modules 404, 406, 408 and 470 that communicate with outside modules. Examples of such communications are discussed above with respect to FIGS. 5A, 5B, and 6.

In FIG. 9, the auto-id node 400 includes a component manager 902 that dynamically loads components for use in the auto-id node 400. In other words, the component manager 902 has an extensible infrastructure that enables the auto-id node 400 to add new components, or switch to use of different components at run time, without disrupting an operation of the auto-id node 400.

For example, the component manager 902 may be operable to add a new adaptor component (e.g., the adapter 610 of FIG. 6) that communicates with a new type of device, without needing to stop and restart the auto-id node 400. In another example, the component manager 902 may be operable to use a new version of a data converter component (for example, a version that is compatible with a new version of a backend system), to replace an older version of the data converter at run-time. As a result, the auto-id node 400 is upgraded seamlessly in the productions environment to communicate with the new version of a backend system.

A component repository 904 stores a number of components that may be used by the auto-id node 400. As such, the component repository 904 acts as a components warehouse for the auto-id node 400. The component repository 904 may include, for example, a number of adaptor components corresponding to devices with which the auto-id node 400 communicates, a number of communicators that communicate in different communication protocols, a number of data converters that convert data of different formats, a number of activity handlers (e.g., the activity handler 414 of FIG. 4), or a number of rules and rule sets (e.g., the rule sets 420, 422 of FIG. 4). The component repository 904 may obtain components by, for example, downloading components from external backend systems, or from other auto-id nodes. The component repository 904 also may remove components that the auto-id node 400 no longer uses.

A component loader 906 may load a component from the component repository 904 based on item data received at the auto-id node 400. Item data, in general, refers to data that is received by the auto-id node 402 from the various outside modules 404, 406, 408 and 470, or that is otherwise processed by the auto-ide node 400. Such item data may include, for example, item tracking data received from devices 112-118, device controllers 212-216, or device manager 312. Item data also may include data received from other auto-id nodes, backend systems, or user interfaces, and may include, for example, rules or rule sets, static data about the items received from backend systems, or data obtained by the user interfaces from human operators/administrators.

The component loader 906 may be external to the component manager 902, as shown in FIG. 9. In other implementation, the component loader 906 may be internal to the component manager 902.

In one implementation, the component loader 906 searches the component repository 904 for a particular type of component. In some implementations, the component loader 906 also may search outside the auto-id node 400, for example, in another auto-id node, or in a backend system, to obtain a particular component. More specifically, the component loader 906 may, for example, load a HTTP communicator component when receiving a SOAP message, or may load a TCP/IP communicator component when receiving a socket message.

The component loader 906 also includes a configuration setting file 908. The configuration settings file 908 may be an external file to the applications in the auto-id node 400, and may be loaded when the applications run. The configuration settings file 908 may be, for example, in the format of a text file or an extensible mark-up language (XML) file. The configuration settings file 908 may be defined when the auto-id node 400 is first deployed, but can be changed as needed. In one example, the configuration settings file 908 is extensible, such that definition of new components and their properties may be added. In another example, the auto-id node 400 may use configuration setting file 908 to change settings of the components, without recompiling the components.

The configuration setting file 908 registers the components to the auto-id nodes 400. In other words, the configuration setting file 908 may serve as a map for the component loader 906 to locate a component. For example, the configuration setting file 908 may include the locations of the components in the component repository 904, or, in other implementations, locations outside of the auto-id node 400. The configuration setting file 908 also may specify a specific version of a component, such as, for example, a current version. The configuration file 908 may be one file, or may be in the format of multiple files that are stored or organized in different locations.

In some implementations, the configuration setting file 908 may define a selected list of components that may be active in the auto-id node 400. The component loader 906 may load the components upon start-up, based on the selected list. Further, the active auto-id node 400 may be duplicated in another auto-id node by copying the above mentioned settings, i.e., the selected list of active components in the auto-id node's 400 configuration setting file 908.

The configuration setting file 908 also may include some of the components' properties. For example, the configuration setting file 908 may provide some component properties data needed to instantiate the component. The configuration settings file 908 also may support dynamic properties that allow the auto-id node 400 to make changes to property values, without recompiling the run-time component. For example, a rule set of a retail store may include rules for the four seasons of the year. By setting the property "season" to a current season, for example, "winter," the auto-id node 400 may apply winter rules for the received events.

As discussed in FIGS. 5 and 6, the integration modules 404, 406, 408 and 470 may communicate with a number of outside modules with different adaptors 610, such as, for example, a RFID Reader adaptor 910, a scanner adaptor 912, and virtually any other adaptors, (represented in FIG. 9 as a generic adaptor x 914). The component manager 902 may load the adaptors dynamically, based on a connection request from the outside modules. For example, the component manager 902 may load the RFID reader adaptor 910 when receiving a connection request from the RFID reader 114.

Further, the component manager 902 may dynamically load other needed components for the active adaptors to the integration module 404,408,408,470 at run-time. For example, the component manager 902 may load a commumcator component A 920 and a data converter component C 928 for the RFID Reader Adaptor. Meanwhile, the scanner adaptor 912 may use a communicator B 922 and a data converter C 926. The adaptor x 914, meanwhile, may use a communicator B 924 and a data converter E 929.

In FIG. 9, the communicator B 922 and the communicator B 924 are two active instances of the same component B. In other words, the different adaptors, i.e. the scanner adaptor 912 and the adaptor x 914, share the same communicator component from the component repository 904. For example, a TCP/IP communicator component may be commonly used among many adaptors for devices, device controllers and device management modules.

The shared components provide more efficiency in the auto-id node 400's development and maintenance. In this example, only one TCP/IP communicator component needs to be developed. Also, the component repository 904 need only load and store one copy of this TCP/IP communicator component. When changes are implemented on this TCP/IP component, only one copy of the component code needs to be changed.

As shown in FIG. 9, instances 920-929 are active instances. As such, the instances 920-929 are running processes in the data processing module, i.e., the integration modules 404, 406, 408, 470. However, maintaining a relatively large number of instances in an active mode may result in heavy load on the processing power and the memory usage of the auto-id node 400, such that the auto-id node 400 may operate relatively slowly. As a result, some instances may be stored in a passive form.

For example, in FIG. 9, a passive instances pool 930 may store a large number of such passive instances of the components. As just referenced, a passive instance is a static form of an active instance. More specifically, the passive instance may include the data and state information of an active instance. As a result, a newly-instantiated component may load a passive instance to recreate a corresponding active instance.

A running component, i.e., an active instance, may export its passive instance and save it in the passive instances pool 930. On the other hand, a passive instance may be imported to a component to recreate the active instance of the component. In some implementations, the passive instance may be copied and passed on to other auto-id nodes or systems. Hence, the active instance may be duplicated elsewhere.

The passive instances pool 930 provides a buffer for the auto-id node 400 to hold part of its work load inactive, and, in turn, save the auto-id node 400's processing power. As a result, the auto-id node 400 increases its performance by focusing on a limited number of active instances running concurrently. Further, when the auto-id node 401 receives a large number of requests at the same time, the passive instance pool may prevent the auto-id node 401 from crashing by serializing its work load.

An instance manager 931 may be used to manage the switching between active instance(s) and the passive instances in the passive instances pool. The instance manager 931 may be internal to each functional module, e.g. the communicator 620, or the converter 630. In other implementations, the instance manager 931 may be external to the functional modules. The instance manager 931 may be part of the data processing module, as shown in FIG. 9, may be external to the data processing module. There may be one or more instance managers 931, as needed. Also, in some implementations, the instance manager 931 may be part of the component manager 902 or the component loader 906.

The instance manager 931 may be configurable to define a limit number of active instances for each component that may be allowed in the auto-id tracking system. As illustrated in FIG. 9, the instance manager 931 may define that the adaptor 610 may have three active instances, the communicator 620 may have three active instances, and the data converter 630 may have three active instances.

The number of active instances for each component may be configured during the operation of the auto-id node to adjust to different circumstances. The instance manager 931 may be operable to optimize the distributions of its processing power among different components by adjusting their respective limit number of active instances. For example, the instance manager 931 may grant a higher number of active instances to a heavily loaded component, and grant a lower number of active instances for a less active component.

In one specific example, a new adaptor may request to communicate with the auto-id node 400. The instance manager may be configured to increase the active instance limit number for component adaptors 610 to four, so as to be able to respond to the new adaptor without deactivating the current adaptors RFID reader adaptor 910, scanner adaptor 912, adaptor 914. Further, the instance manager may be configured to reduce the limit number of the active instances for the communicator 620 or the data converter 630 to accommodate the addition of the new adaptor Y active instances.

In one implementation, a component in the auto-id system, e.g., 610, 620 and 630, may keep an additional active instance to assist the process of switching between a passive instance and an active instance. As a result, the component 610, 620, 630 may maintain a constant number of active instances running without wasting time waiting for a passive instance to be swapped in. Also, the additional active instance may be used to swap a newly received request into a passive instance, without disrupting the operation of an existing active instance for the swapping task.

Further in FIG. 9, the passive instances pool 930 includes a passive instance pool A 932, which stores the passive instances of the communicator component A 920. A passive instance pool C 934 includes passive instances for data converter component C 926, 928. Pool A 932 includes three passive instances: instance A1 936, instance A2 938, and instance A3 940. These three instances may represent, for example, three communication requests from a RFID reader. The passive pool C 934 includes instance C1 942 and instance C2 944, which may represent, for example, two data packets that are received from the RFID reader adaptor 910 and/or the scanner adaptor 912.

Thus, the implementations of auto-id node 400 in FIG. 9 provide a flexible infrastructure, which separates the description of functionality from the implementations. As a result, the auto-id node 400 is able to switch to use a different implementation of a functional module, and to add new implementations of the functional module at run-time. The system also enables multiple functional modules to share and reuse a component. Further, the system, as shown in FIG. 9, allows the auto-id node 400 to change parameters of a running instance of a function module dynamically. As a final example, the passive instances allow the auto-id node 400 to manage its work load, as well as enabling copying and transferring instances of a running functional module, i.e., an active instance of a component.

Figure 10:
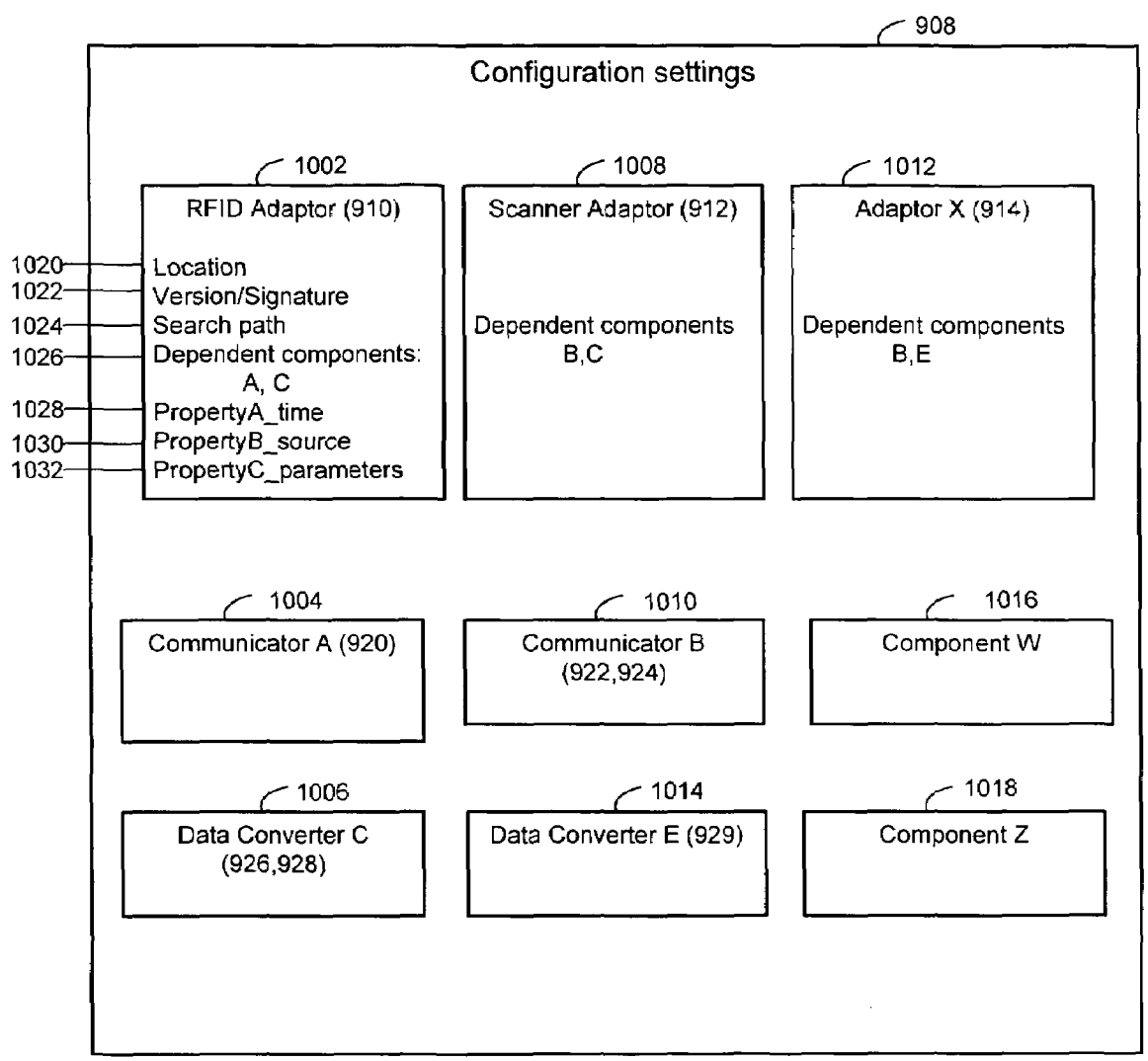
FIG. 10 is a block diagram of a configuration settings file used in the implementation of FIG. 9.

FIG. 10 is a block diagram of a configuration settings file 908. The configuration settings file 908 may reside outside of the compiled code, i.e., the running system of the auto-id node 400, and may be loaded into the system at run-time. Hence, the configuration settings file 908 enables the dynamic configuration of the auto-id node 400, without the need to stop and restart the auto-id node 400. The content of the configuration settings file 908 demonstrates examples of the dynamically configurable features of the auto-id node 400.

In general, every component in the component repository 904 is registered in the configuration settings file 908. The registered information of each component may include information needed for the component manager 902 to find the component, information needed when instantiating the component, and, in some implementations, may include configurable dynamic properties of the component. Since information in the configuration settings file 908 are configurable, the auto-id node 400 is enabled to load components dynamically from configured locations and with dynamic properties.

Referring to FIG. 10, the configuration settings 908 shows the configuration sections for the loaded components in FIG. 9. Generally, such configuration sections serve to register the dynamic location and properties of each of the components as discussed above, and/or the dependency between the component and some other components that resides in the component repository 904.

To list a few examples, a configuration section 1002 configures the RFID reader adaptor 910, while a configuration section 1004 configures the communicator A 920. A configuration section 1006 configures the data converter C 928, and a configuration section 1008 configures the scanner adaptor 912. A configuration section 1010 configures the scanner adaptor 912, and a configuration section 1012 configures the adaptor x 914 A configuration section 1014 configures the communicator B 922,924, and, finally a configuration section 1014 configures the data converter E 928.

A configuration section 1016 of a component W and a configuration section of component Y are examples of configuration sections for other components that are not shown in FIG. 9. There may be still many other configuration sections for other components in the component registry in the configuration settings 908 that are not shown here for the sake of clarity.

In a specific example, the configuration section 1002 in the configuration settings 908 stores the configuration information of the component RFID Reader Adaptor 920. The configuration 1002 includes a location 1020 of the component A, e.g., a path where the component A resides in the component repository 904.

Further, the configuration section 1002 may include a version number 1022 to identify the component. The component RFID reader adaptor 920 may have multiple versions, for example, each version is developed at a different time, and may be compatible with different model(s) of the RFID reader device. The component manager 902 may match the version number of the source RFID reader device with the version number 1022 to determine whether to load the component registered in configuration section 1002, i.e., the RFID reader adaptor 920.

In some implementations, the component is implemented in a way, such that the functionality and implementation of the component is separated, and such that multiple implementations may exist for the same functionality. For example, the functionality of a component may be described by an interface. Many classes may implement the interface, and the auto-id node 400 may reference the interface in its compiled code. The configuration settings 908 may configure the auto-id node 400 to choose one specific implementation, i.e., a particular class, dynamically, at run-time, to complete the functionality defined in the interface. In this example, a class name 1022 is used to select the desired implementation of RFID reader Adaptor 920.

A search path 1024 may include information as to where to find the component if the component does not reside in the component repository 904. The search path 1024 may describe one or more possible locations for the component outside the auto-id node 400. For example, the search path 1024 may include a remote machine name and/or a file path, an identification of a neighboring auto-id node, or connection information to a database or repository.

Dependent components 1026 reference one or more components that the current component uses. In one implementation, the component manager 902 loads the dependent components along with the current component. In this example, the RFID reader adaptor 920 uses the communicator component A of the instance 920 and a data converter C of the instance 922. The component manager 902 may, for example, load the component A and component A's dependent components based on the configuration section 1004, load the component C and component C's dependant components based on the configuration section 1006, and then load the RFID reader adapter 910.

Similarly, the configuration section 1008 indicates that the scanner adaptor component uses communicator B of instance 922,924 and data converter C of instance 928; while the configuration section 1012 indicates that the adaptor x of instance 914 uses the communicator B of instance 922, 924 and the data converter E of instance 928. In this infrastructure, a component may easily change to use a different dependant component, simply by changing its dependent component's property.

For example, the component data converter C of instance 928 and the component data converter E of instance 928 may share the same data converter functionality (for example, both components may implement the same data converter interface, and hence may be interchangeable). The adaptor X may change to use the data converter C of instance 928 instead of the data converter E of instance 929 by simply changing the configuration section 1012's dependant component property from E to C.

Properties 1028-1032 are a list of exemplary dynamic properties for the RFID adaptor. For example, the property A 1028 may specify that the RFID tag are unpredictable in their placement, and hence the RFID adaptor may activate its "decide orientation module" to process each tag. Later, the property A 1028 may be changed to specify that the RFID tags are always oriented the same way (e.g., after some improvement in the scanning method), so that the RFID adaptor may then operate without running the "decide orientation" module, and may thus have improved performance. Similarly, property B 1030, property C 1032, and potentially other properties, may represent other configurable parameters for the RFID adaptor component of instance 910.

FIG. 10 illustrates an example in which seven configuration sections are used for the seven components that are active in the auto-id node 400 in FIG. 9. Each may include the current settings, i.e. locations, properties, dependent components, and/or other related information, of the component in the auto-id node 400. The configuration sections may be modified and loaded while the auto-id node 400 is operating. The content of the configuration sections, as discussed above, illustrates the dynamic manageable features of the components in the auto-id node 400.

Figure 11:
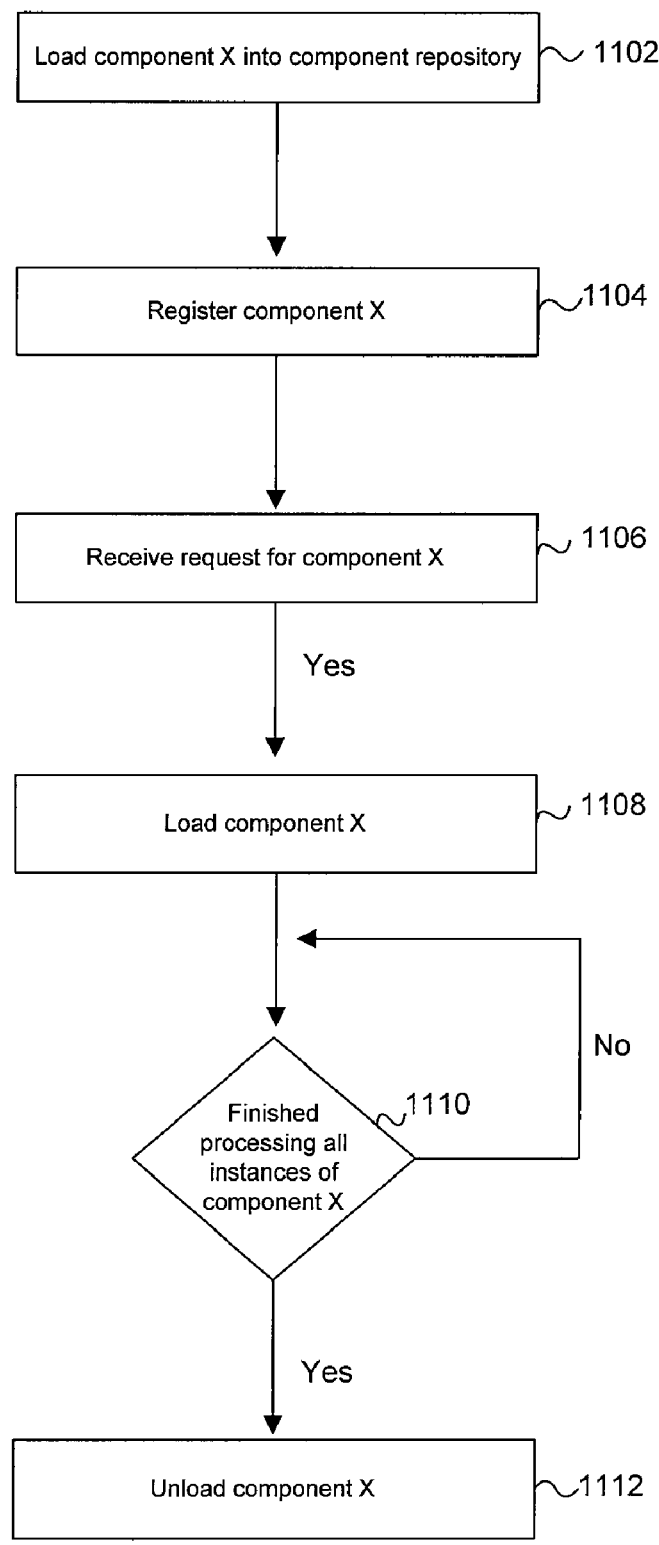
FIG. 11 is a flow chart of a life cycle of a component used in the implementation of FIG. 9 and FIG. 10.

FIG. 11 is a flow chart of a life cycle of a component used in the implementation of FIG. 9 and FIG. 10. A component in general, as explained above, is a functional program module that is implemented to complete a particular task. The component may be a piece of code, a software program, a class module, an instruction set, and/or a script. The component may reside in a development machine, a backend system, or even in another auto-id node.

As discussed in previous examples, a component may be an adaptor, a communicator, or, a data converter for the integration modules 402, 404, 406, 470. Further, a component may be a rule set, an activity handler, or a rule engine in the core services module 402. The components may be instantiated in a data processing module, which may include, for example, the core services module 402, the integration modules 404, 406, 408, 470, or other modules in the auto-id node 400. Such components may represent the dynamic part of the data processing modules, and may be loaded at run time according to, for example, the configuration settings file 908. The infrastructure of the auto-id system 400 in FIG. 9 allows the auto-id node to adapt new components easily.

On the other hand, the static part of the data processing module, which may include, for example, the event message dispatcher 412, association data management 423, configuration and administration management 440, storage and archiving management 450, and some parts of the integration modules 404, 406, 408, 470, as well as the component manager 902 and the component loader 906, may be considered the "backbone" of the auto-id node begins its operations 400. The "backbone" part of the auto-id node 400 is loaded when the auto-id node 400. Therefore, changes to the "backbone" would need to stop and restart the auto-id node in order to be deployed. Thus, having the "backbone" component loaded in the auto-id node without needing run-time management, as describe herein, increases the auto-id node's 400 performance.

In the example of FIG. 11, a new component X, e.g., an adaptor for a new version of a RFID reader, is developed and ready to be deployed to the auto-id node 400. The auto-id node 400 loads the component X into the component repository 904 (1102). For example, an auto-id operator may manually load the component X into the auto-id node, or an enterprise application 202 may instruct the auto-id node to load the component from a particular machine. In another example, a neighboring auto-id node may propagate the component X to the auto-id node 400.

Once the component X is physically loaded into the component repository 904, the component X then registers with the auto-id node 400 (1104) such that the component loader 906 is able to find and instantiate the newly added component X. In one implementation, the location of the component X, as well as other related configuration properties of the component X, are added to the current configuration settings 908. For example, a configuration section 1002 may be added to the configuration settings file 908. The auto-id node 400 is thus ready to process requests that would be handled by the component X.

Once the auto-id node 400 receives a request for the component X (1106), for example, the RFID reader scans a tag and requests the auto-id node 400 to process the event. The auto-id node 400 then activates the component manager 902 to load the component X, i.e., the RFID reader adaptor component of instance 910 (1108). The component loader 908 looks up the configuration setting file 908 and finds the configuration section 1002 for the component X. Using, for example, the location 1020, version/class name 1022, and/or search path, the component loader 906 may find the component X from the component repository 904. In another example, the component loader 906 may download the component X from an outside module. The component loader 906 may then load all the dependant components of the component X, e.g., component A of instance 920 and component C of instance 928.

The component loader 906 may then instantiate the component X and its dependent components(component A and C) in the integration module 404, 406, 408, 470. For example, the RFID Reader Adaptor instance 910, as well as the active instances of its dependent components, (i.e. communicator A 920 and data converter C 926) may be running in the integration modules 404, 406, 408, 470. The active instances of the RFID Reader Adaptor instance 910, as well as the communicator A 920 and data converter C 926, may now process the requests from the RFID device that communicated with the auto-id node 400 earlier. Further, more requests from the RFID reader device may thus be handled by the loaded component X and its dependent components. Details of the active instances of components processing received requests are further discussed in FIG. 12.

The component manager 902 may, for example, periodically check whether the component X has finished processing all of its instances (1110). In another implementation, the component manager 902 may check if the active instance X has been idle for a certain period of time, and, if so, the component manager 902 may unload the component X (1112).

Figure 12:
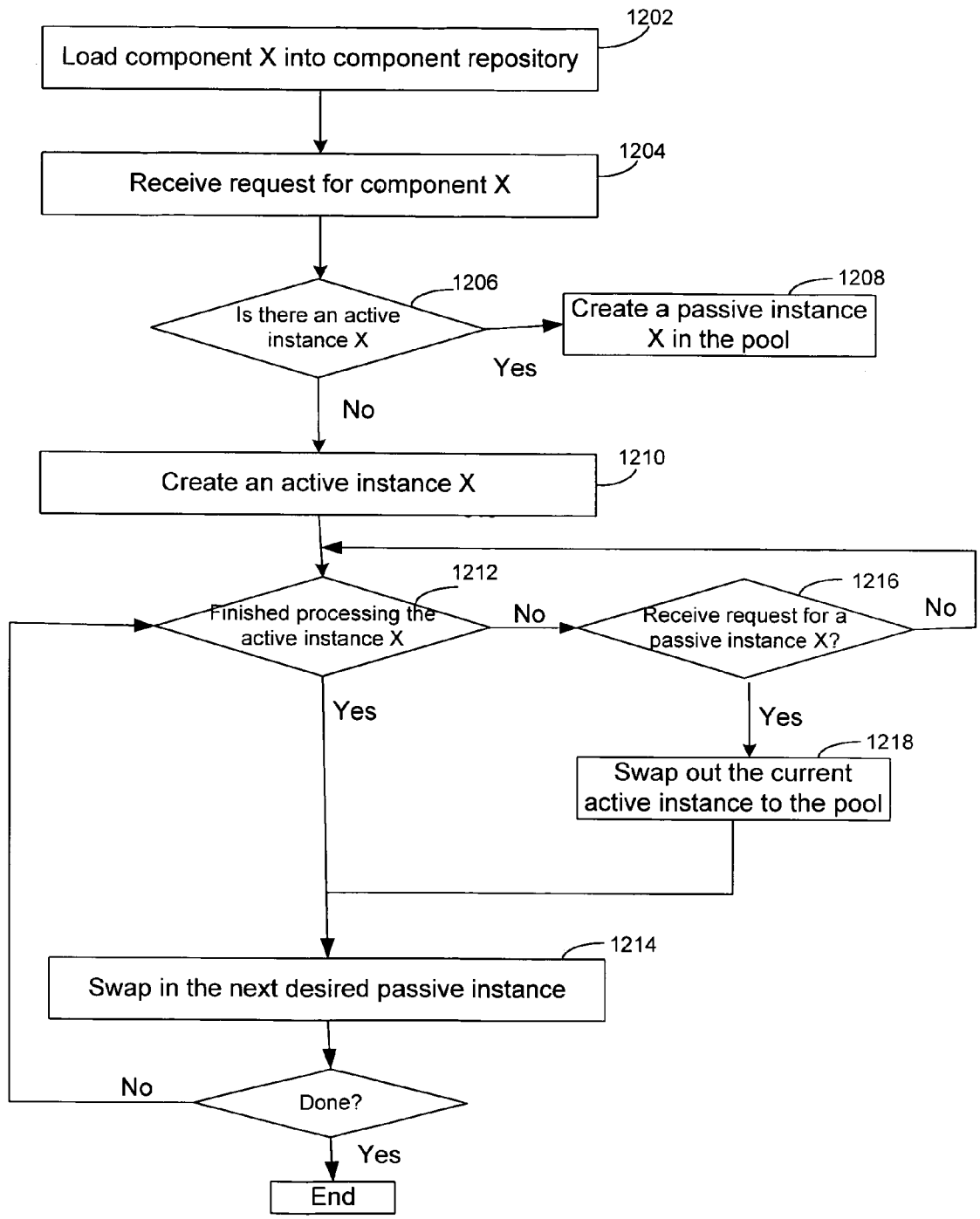
FIG. 12 is a flow chart of a life cycle of an instance of the components of the system of FIGS. 9 and 10.

FIG. 12 is a flow chart of a life cycle of an instance of the components of the system of FIGS. 9 and 10. As discussed earlier, an instance refers to a running copy of a component in the process of handling item data. In general, the life cycle of an instance starts from when the instance is instantiated from the component, along with the item data. The life of the instance ends at the time when the instance finishes processing the item data. An active instance generally requires processing power of the auto-id node 400. Hence, each data processing module in the auto-id node 400 may allow a limited number of active instances to exist concurrently.

In the auto-id node 400, as shown in FIG. 9, the instance manager 931 and the passive instances pool 930 enable the instances to be kept in an intermediate state, i.e., the passive instance state, during its life cycle, such that the instance may be kept and processed at a later time without occupying the auto-id node's 400 processing power.

As a specific example, an instance of an activity handler component may handle shipments related item data. In this example, the shipment activity handler component is designed to match a received RFID reader event with a shipping document within an enterprise system. The shipment activity handler instance starts when a new RFID reader event is received, i.e., when an item is scanned by the RFID reader device. The shipment activity handler instance then starts a search in one or more backend system or repositories to find a corresponding shipment document for the scanned item. If the shipment document is found, the shipment activity handler instance further processes the shipment document, for example, to update the item's status to "received" in the shipment document. At this time, the shipment activity handler instance completes its task and its life ends.

In one example, the searching for shipment document process may take some time to complete. The shipment activity handler instance may spend most of its life time waiting for the search result. Meanwhile, the RFID reader may scan many other items, and may initiate many new instances of the shipment activity handler component in the auto-id node 400. To the extent that the number of the concurrent active instances is limited, the instance manager 931 may save some of the instances as passive instances in the passive instance pool 930. In some implementations, the instance manager 931 may export some of the passive instances to be processed, for example, in the neighboring auto-id nodes, to relieve the work load on the auto-id node 400.

Referring to the flow chart in FIG. 12, the auto-id node 400 may first load the component X, e.g., the shipment activity handler component, into the component repository 904 (1202), as described in FIG. 11. The auto-id node 400 receives a request for the component X, e.g., the shipment activity handler component (1204). More specifically, a RFID reader scans an item and requests the auto-id node 400 to process the scanned event. The data processing module, i.e., the core services module 402, may allow only one active instance of the component X. The core services module 402 checks to see if there is already an active instance running (1206). In other words, the core services module 402 checks to see if there is still space to create a new active instance.

If there is no active instance found, the core services module 402 instantiates a first active instance of the component X in the core services module (1210), which then starts to process the received request, i.e., the RFID scanning event. On the other hand, if the core services module finds that there is already a running instance of the component X, (in other word, the system is busy), the core services 402 may create a passive instance for the received request and save it in the passive instance pool 930 (1208).

There may be other implementations, for example, the core services 402 may allow a limited number of active instances to run concurrently. A new instance may be put in the passive instances pool 930 only if the active instances in the core services reaches the limited number. In yet another example, a new instance may not be put into the passive pool right away, rather, an existing active instance may be swapped out into the passive instance pool 930 while the new instance is added as a new active instance into the core services module 402. There may be other implementations of the instance swapping rules.

When one active instance finishes its processing (1212), the core services 402 may swap in the next passive instance from the passive instance pool 930 (1214). The process checks to see if all the passive instances for the component are processed, and, if so, that is the end of the instance's life cycle.

If not, the active instance continues the process 1212 and 1214. During the process, he core services module 402 may receive an item data for a passive instance (1216). For example, the core services module 402 may receive a search result of a shipment document for an item. The instance that is associated with the item may be in the passive instance pool. The core services module 402 may then swap out the current active instance to the passive instance pool 930 (1218), such that a new instance may be swapped in. The core services module 402 may then find the passive instance that is associated with the item, and swap in the passive instance into the core services module 402.

The process 1212-1218 continues until all instances of the component X are processed. Finally, the component X may be unloaded, as illustrated in FIG. 11 (1112 and 1114).

The dynamically managed instances as shown in FIG. 12 allows the auto-id node to efficiently manage its resources, e.g., its processing power and memory usage, such that the auto-id node is able to handle a large number of requests at its own pace. Further, by switching idling active instances to passive instances, a performance of the auto-id node may be increased. The portability of active instances may assist distribution of work load to other auto-id nodes and/or systems, and may assist testing of the auto-id node's function or performance. A number of implementations have been described. Nevertheless, it will be understood that various modifications may be made. Accordingly, other implementations are within the scope of the following claims.

What is claimed is:

1. A computer-implemented method comprising:
   receiving, at an auto-ID node and from an adapter, a request to process item data that tracks a status of an item in a supply chain;
   selecting adaptor, communicator, and converter components for the adapter based on receiving the item data;
   determining, based on limits associated with a quantity of active instances of the selected components, whether active instances of the selected components may be instantiated;
   dynamically instantiating, if determining that the active instances of the selected adaptor, communicator, or converter components may be instantiated, an active instance of the selected adaptor, communicator, or converter components;
   dynamically instantiating, if determining that the active instances of the selected adaptor, communicator, or converter components may not be instantiated, a passive instance of the selected adaptor, communicator or converter components;
   swapping the passive instance of the selected adaptor, communicator, or converter components to an active instance of the selected adaptor, communicator, or converter component, when a respective active instance of the selected adaptor, communicator, or converter components finishes processing;
   processing the event using the active instances of the selected components;
   outputting the processed item data; and
   de-instantiating the active instances of the adaptor, communicator, and converter components based on processing the event.

2. The method of claim 1, wherein the adapter comprises a radio frequency identification device (RFID) reader, a barcode scanner, a smart card, a voice recognition system, an optical character recognition system a biometric system, a device controller, a device manager, a second auto-ID node, a backend system, a generic adapter, or a user interface.

3. The method of claim 1,
   wherein the adaptor component handles communications between the auto-ID node and the adapter using the communicator and converter components,
   wherein the communicator component handles a data transport aspect of the communications using a variety of different types of communication protocols, communication modes, and communication channels, and
   wherein the converter component handles a data conversion aspect of the communications, converting the item data into an internal message format used by the auto-ID node.

4. The method of claim 1, wherein the active instances of the selected adaptor, communicator, or converter components are dynamically instantiated at run time without disrupting an operation of the auto-ID node.

5. The method of claim 1, further comprising:
   storing the selected adaptor, commumcator, and converter component in a component repository that stores a pool of adaptor, communicator, and converter components,
   wherein the selected adaptor, communicator, and converter components are selected from the pool of adaptor, communicator, and converter components.

6. The method of claim 4, further comprising storing a pool of activity handles, rules, and rule sets in the component repository.

7. The method of claim 1,
   wherein a hyper-text transfer protocol (HTTP) communicator component is selected based on the item data being received via a Service Oriented Architecture Protocol (SOAP), and
   wherein a Transmission Control Protocol/Internet Protocol (TCP/IP) communicator component is selected based on the item being received via a socket message.

8. The method of claim 1, further comprising registering a version, a location and configuration data of the adaptor, communicator, and converter components in a configuration settings file.

9. The method of claim 1, wherein selecting the adaptor, communicator, and converter components further comprises:
   selecting the adaptor component for the adapter based on the adapter;
   accessing a dependent components portion of a configuration setting file;
   selecting the communicator and converter components associated with the selected adaptor component based on accessing the dependent components portion.

10. The method of claim 1, wherein the passive instance of the selected adaptor, communicator, or converter components includes state information of the respective active instance of the selected adaptor, communicator, or converter components.

11. The method of claim 1,
   wherein the active instances are executing instances, and
   wherein the passive instances are stored, non-executing instances.

12. The method of claim 1, further comprising dynamically configuring the limits associated with the quantity of active instances of the selected components.

13. The method of claim 11, wherein the limits are dynamically configured based on a load of the auto-ID node, based on the respective active instance of the selected adaptor, communicator, or converter components finishing processing, or based on a dynamically instantiating the active instance of the selected adaptor, communicator, or converter components.

14. The method of claim 11, wherein dynamically configuring the limits associated with the quantity of active instances of the selected components further comprises:
   increasing the limit prior to swapping the passive instance of the selected adaptor, communicator, or converter components; and
   decreasing the limit after swapping the passive instance of the selected adaptor, communicator, or converter components.

15. The method of claim 1, wherein determining whether the active instances of the selected components may be instantiated further comprises whether any active instances of the selected components are instantiated.

16. The method of claim 1, wherein the passive instance of the selected adaptor, communicator, or converter component is dynamically instantiated only if the quantity of active instances reaches the limits.

17. The method of claim 1, wherein the passive instance of the selected adaptor, communicator, or converter component is dynamically instantiated when the respective active instance finishes processing.

18. The method of claim 1, wherein de-instantiating the active instances further comprises unloading the active instances.

19. A computer program product, tangibly embodied in a machine-readable medium, the computer program product comprising instructions that, when read by a machine, operate to cause data processing apparatus to:

receive, at an auto-ID node and from an adapter, a request to process item data that tracks a status of an item in a supply chain;

select adaptor, communicator, and converter components for the adapter based on receiving the item data;

determine, based on limits associated with a quantity of active instances of the selected components, whether active instances of the selected components may be instantiated;

dynamically instantiate, if determining that the active instances of the selected adaptor, communicator, or converter components may be instantiated, an active instance of the selected adaptor, communicator, or converter components;

dynamically instantiate, if determining that the active instances of the selected adaptor, communicator, or converter components may not be instantiated, a passive instance of the selected adaptor, communicator or converter components;

swap the passive instance of the selected adaptor, communicator, or converter components to an active instance of the selected adaptor, communicator, or converter component, when a respective active instance of the selected adaptor, communicator, or converter components finishes processing;

process the event using the active instances of the selected components;

output the processed item data; and de-instantiate the active instances of the adaptor, communicator, and converter components based on processing the event.

20. A device comprising:

a component loader of an auto-ID node, the component loader configured to:

receive, from an adapter, a request to process item data that tracks a status of an item in a supply chain, select adaptor, communicator, and converter components for the adapter based on receiving the item data, dynamically instantiate, if determining that active instances of the selected adaptor, communicator, or converter components may be instantiated, an active instance of the selected adaptor, communicator, or converter components, dynamically instantiate, if determining that the active instances of the selected adaptor, communicator, or converter components may not be instantiated, a passive instance of the selected adaptor, communicator or converter components, swap the passive instance of the selected adaptor, communicator, or converter components to an active instance of the selected adaptor, communicator, or converter component, when a respective active instance of the selected adaptor, communicator, or converter components finishes processing, and de-instantiate the active instances of the adaptor, communicator, and converter components based on processing the event;

an instance manager configured to determine, based on limits associated with a quantity of active instances of the selected components, whether the active instances of the selected components may be instantiated; and a core services module configured to:

processing the event using the active instances of the selected components, and outputting the processed item data.

\* \* \* \* \*